US010891827B2

(12) United States Patent
Acres

(10) Patent No.: US 10,891,827 B2
(45) Date of Patent: *Jan. 12, 2021

(54) METHOD FOR SHARING GAME PLAY ON AN ELECTRONIC GAMING DEVICE

(71) Applicant: Patent Investment & Licensing Company, Las Vegas, NV (US)

(72) Inventor: John F. Acres, Las Vegas, NV (US)

(73) Assignee: ACRES TECHNOLOGY, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,827

(22) Filed: Aug. 1, 2019

(65) Prior Publication Data

US 2019/0355210 A1 Nov. 21, 2019

Related U.S. Application Data

(60) Continuation of application No. 15/349,742, filed on Nov. 11, 2016, now Pat. No. 10,410,467, which is a (Continued)

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC .......... *G07F 17/3272* (2013.01); *G07F 17/32* (2013.01); *G07F 17/3213* (2013.01); (Continued)

(58) Field of Classification Search
CPC ...... G07F 17/32; G07F 17/34; G07F 17/3293; G07F 17/3262; G07F 17/3232; G07F 17/3286; G07F 17/3258; G07F 17/3272; G07F 17/3211; G07F 17/3213; G07F 17/326; G07F 17/3225; G07F 17/3267; G07F 17/3251; G07F 17/3274; G07F 17/3279; A63F 13/33; A63F 13/71; (Continued)

(56) References Cited

U.S. PATENT DOCUMENTS 4,391,444 A 7/1983 Bromley
4,652,998 A 3/1987 Koza et al.
(Continued)

FOREIGN PATENT DOCUMENTS

CA 2 564 433 A1 2/2006
CA 2564433 2/2006
(Continued)

OTHER PUBLICATIONS

"Multi-monitor", May 1, 2007, Wikipedia, <https://en.wikipedia.org/w/index.php?title=Multi-monitor&oldid=127392682>.

*Primary Examiner* — Justin L Myhr
(74) *Attorney, Agent, or Firm* — Alan T. McCollom

(57) ABSTRACT

Embodiments of the present concept provide an electronic gaming device that facilitates wagering by multiple players on a single gaming device. Also provided is a method of sharing game play on such a gaming device, where the method includes receiving a wager from a first player at a first gaming station, receiving a wager from a second player at a second gaming station, initiating a gaming event that is displayed at the first and second gaming stations, and awarding prizes associated with gaming outcomes displayed at the first and second gaming stations.

20 Claims, 15 Drawing Sheets

Related U.S. Application Data division of application No. 13/466,314, filed on May 8, 2012, now Pat. No. 9,530,283, which is a division of application No. 12/167,549, filed on Jul. 3, 2008, now Pat. No. 8,192,267.

(52) U.S. Cl.
CPC ...... *G07F 17/3216* (2013.01); *G07F 17/3225* (2013.01); *G07F 17/3244* (2013.01); *G07F 17/3293* (2013.01); *G07F 17/34* (2013.01)

(58) Field of Classification Search
CPC ...... A63F 3/00157; A63F 13/12; A63F 13/30; A63F 13/50; A63F 13/847; A63F 2250/13
See application file for complete search history.

(56) References Cited

U.S. PATENT DOCUMENTS

| | | | |
|---|---|---|---|
| 4,861,041 | A | 8/1989 | Jones et al. |
| 5,159,549 | A | 10/1992 | Hallman, Jr. et al. |
| 5,249,805 | A | 10/1993 | Neil et al. |
| 5,332,076 | A | 7/1994 | Ziegert |
| 5,380,012 | A | 1/1995 | Jones et al. |
| 5,741,183 | A | 4/1998 | Acres et al. |
| 5,766,076 | A | 6/1998 | Pease et al. |
| 5,851,148 | A | 12/1998 | Brune et al. |
| 5,923,306 | A | 7/1999 | Smith et al. |
| 6,022,274 | A | 2/2000 | Takeda et al. |
| 6,142,872 | A | 11/2000 | Walker et al. |
| 6,154,186 | A | 11/2000 | Smith et al. |
| 6,155,926 | A | 12/2000 | Miyamoto |
| 6,186,505 | B1 | 2/2001 | Perrie et al. |
| 6,203,430 | B1 | 3/2001 | Walker et al. |
| 6,244,958 | B1 | 6/2001 | Acres |
| 6,287,197 | B1 | 9/2001 | Dickinson et al. |
| 6,320,110 | B1 | 11/2001 | Ishikawa et al. |
| 6,474,647 | B1 | 11/2002 | Zakhar |
| 6,485,367 | B1 | 11/2002 | Joshi |
| 6,511,376 | B2 | 1/2003 | Walker et al. |
| 6,612,927 | B1 | 9/2003 | Slomiany et al. |
| 6,656,040 | B1 | 12/2003 | Brosnan et al. |
| 6,733,390 | B2 | 5/2004 | Walker et al. |
| 6,758,751 | B2 | 7/2004 | Soltys et al. |
| 6,758,757 | B2 | 7/2004 | Luciano, Jr. et al. |
| 6,764,397 | B1 | 7/2004 | Robb |
| 6,780,109 | B2 | 8/2004 | Kaminkow |
| 6,790,141 | B2 | 9/2004 | Muir |
| 6,793,577 | B1 | 9/2004 | Wilkins et al. |
| 6,811,486 | B1 | 11/2004 | Luciano, Jr. et al. |
| 6,902,478 | B2 | 6/2005 | McClintic |
| 6,921,333 | B2 | 7/2005 | Taguchi |
| 6,923,446 | B2 | 8/2005 | Snow |
| 6,926,607 | B2 | 8/2005 | Slomiany et al. |
| 6,981,635 | B1 | 1/2006 | Hughs-Baird et al. |
| 7,040,622 | B2 | 5/2006 | Sebesta et al. |
| 7,255,351 | B2 | 8/2007 | Yoseloff et al. |
| 7,255,644 | B2 | 8/2007 | Duhamel |
| 7,364,510 | B2 | 4/2008 | Walker et al. |
| 7,591,725 | B2 | 9/2009 | Gatto et al. |
| 7,722,464 | B2 | 5/2010 | Cuddy et al. |
| 7,748,714 | B2 | 7/2010 | Nicely et al. |
| 7,775,873 | B2 | 8/2010 | Aoki et al. |
| 7,833,094 | B2 | 11/2010 | Englman et al. |
| 8,192,267 | B2 | 6/2012 | Acres |
| 8,475,254 | B2 | 7/2013 | Acres |
| 10,217,327 | B2 | 2/2019 | Acres |
| 2001/0052671 | A1 | 12/2001 | Stern |
| 2002/0045474 | A1 | 4/2002 | Singer et al. |
| 2002/0055381 | A1 | 5/2002 | Tarantino |
| 2002/0072412 | A1 | 6/2002 | Young et al. |
| 2002/0125637 | A1 | 9/2002 | Leis |
| 2002/0132660 | A1 | 9/2002 | Taylor |
| 2002/0151338 | A1 | 10/2002 | Taguchi |
| 2002/0160827 | A1 | 10/2002 | Slomiany et al. |
| 2002/0198052 | A1 | 12/2002 | Soltys et al. |
| 2003/0032474 | A1 | 2/2003 | Kaminkow |
| 2003/0036425 | A1 | 2/2003 | Kaminkow et al. |
| 2003/0040357 | A1 | 2/2003 | Baerlocher |
| 2003/0064807 | A1 | 4/2003 | Walker et al. |
| 2003/0100360 | A1 | 5/2003 | Manfredi et al. |
| 2003/0114233 | A1 | 6/2003 | Hiei |
| 2003/0168806 | A1 | 9/2003 | Nigale |
| 2003/0228902 | A1 | 12/2003 | Walker et al. |
| 2003/0232651 | A1 | 12/2003 | Huard et al. |
| 2004/0097287 | A1 | 5/2004 | Postrel |
| 2004/0137978 | A1 | 7/2004 | Cole et al. |
| 2004/0227288 | A1 | 11/2004 | Sebesta et al. |
| 2004/0242297 | A1 | 12/2004 | Walker et al. |
| 2004/0254809 | A1 | 12/2004 | Teicher |
| 2005/0009601 | A1 | 1/2005 | Manfredi et al. |
| 2005/0014554 | A1 | 1/2005 | Walker et al. |
| 2005/0032563 | A1 | 2/2005 | Sines |
| 2005/0037841 | A1 | 2/2005 | Waal et al. |
| 2005/0040601 | A1 | 2/2005 | Yoseloff et al. |
| 2005/0054430 | A1 | 3/2005 | Pitman et al. |
| 2005/0054439 | A1 | 3/2005 | Rowe et al. |
| 2005/0059459 | A1 | 3/2005 | Dunn et al. |
| 2005/0059467 | A1 | 3/2005 | Saffari et al. |
| 2005/0059468 | A1 | 3/2005 | Cannon |
| 2005/0059470 | A1 | 3/2005 | Cannon |
| 2005/0059471 | A1 | 3/2005 | Cannon |
| 2005/0060050 | A1 | 3/2005 | Baerlocher |
| 2005/0064932 | A1 | 3/2005 | Cannon |
| 2005/0070359 | A1 | 3/2005 | Rodriquez et al. |
| 2005/0073102 | A1 | 4/2005 | Yoseloff et al. |
| 2005/0075161 | A1 | 4/2005 | McGlone et al. |
| 2005/0082750 | A1 | 4/2005 | Grauzer et al. |
| 2005/0082760 | A1 | 4/2005 | Yoseloff et al. |
| 2005/0085287 | A1 | 4/2005 | Sines |
| 2005/0119042 | A1 | 6/2005 | Chamberlain et al. |
| 2005/0127606 | A1 | 6/2005 | Snow et al. |
| 2005/0153759 | A1 | 7/2005 | Varley |
| 2005/0187001 | A1 | 8/2005 | Fishel |
| 2005/0187014 | A1 | 8/2005 | Saffari et al. |
| 2005/0211764 | A1 | 9/2005 | Barcelou |
| 2005/0218601 | A1 | 10/2005 | Capellan |
| 2005/0250578 | A1 | 11/2005 | Slomiany et al. |
| 2005/0275167 | A1 | 12/2005 | Wilson |
| 2006/0014577 | A1 | 1/2006 | Snow |
| 2006/0014582 | A1 | 1/2006 | Harris et al. |
| 2006/0014586 | A1 | 1/2006 | Gatto et al. |
| 2006/0040717 | A1 | 2/2006 | Lind et al. |
| 2006/0040727 | A1 | 2/2006 | Lind et al. |
| 2006/0040735 | A1 | 2/2006 | Baerlocher |
| 2006/0052160 | A1 | 3/2006 | Saffah et al. |
| 2006/0063581 | A1 | 3/2006 | Harris et al. |
| 2006/0082063 | A1 | 4/2006 | Moody et al. |
| 2006/0084505 | A1 | 4/2006 | Yoseloff et al. |
| 2006/0084506 | A1 | 4/2006 | Yoseloff et al. |
| 2006/0089196 | A1 | 4/2006 | Parham et al. |
| 2006/0121971 | A1 | 6/2006 | Slomiany et al. |
| 2006/0125177 | A1 | 6/2006 | Gvishi |
| 2006/0135245 | A1 | 6/2006 | Hedrick et al. |
| 2006/0160614 | A1 | 7/2006 | Walker et al. |
| 2006/0178202 | A1 | 8/2006 | Hughes et al. |
| 2006/0189386 | A1 | 8/2006 | Rosenberg |
| 2006/0205468 | A1 | 9/2006 | Saffari et al. |
| 2006/0211479 | A1 | 9/2006 | Walker |
| 2006/0211496 | A1 | 9/2006 | Manz |
| 2006/0224667 | A1 | 10/2006 | Amir et al. |
| 2006/0232012 | A1 | 10/2006 | Boyer |
| 2006/0244216 | A1 | 11/2006 | O'Hagan |
| 2006/0246976 | A1 | 11/2006 | Sines |
| 2006/0247042 | A1 | 11/2006 | Walker et al. |
| 2006/0247053 | A1 | 11/2006 | Mattila |
| 2006/0252546 | A1 | 11/2006 | Castellari et al. |
| 2006/0255541 | A1 | 11/2006 | McBride |
| 2006/0284376 | A1 | 12/2006 | Snow |
| 2006/0284378 | A1 | 12/2006 | Snow et al. |
| 2006/0287043 | A1 | 12/2006 | Englman et al. |
| 2007/0015571 | A1 | 1/2007 | Walker et al. |
| 2007/0026936 | A1 | 2/2007 | Gatto et al. |
| 2007/0054738 | A1 | 3/2007 | Muir |

(56) References Cited

U.S. PATENT DOCUMENTS

| | | | |
|---|---|---|---|
| 2007/0060242 | A1 | 3/2007 | Moody |
| 2007/0060314 | A1 | 3/2007 | Baerlocher et al. |
| 2007/0060321 | A1 | 3/2007 | Vasquez et al. |
| 2007/0077985 | A1 | 4/2007 | Walker et al. |
| 2007/0087798 | A1 | 4/2007 | McGucken |
| 2007/0087835 | A1 | 4/2007 | Van Luchene |
| 2007/0102877 | A1 | 5/2007 | Personius et al. |
| 2007/0111784 | A1 | 5/2007 | Van Luchene |
| 2007/0117623 | A1 | 5/2007 | Nelson et al. |
| 2007/0117637 | A1 | 5/2007 | Morgan et al. |
| 2007/0129144 | A1 | 6/2007 | Katz et al. |
| 2007/0155460 | A1 | 7/2007 | Burnside et al. |
| 2007/0155462 | A1 | 7/2007 | O'Halloran et al. |
| 2007/0155465 | A1 | 7/2007 | Walker et al. |
| 2007/0167210 | A1 | 7/2007 | Kelly et al. |
| 2007/0167226 | A1 | 7/2007 | Kelly et al. |
| 2007/0170651 | A1 | 7/2007 | Matusek et al. |
| 2007/0218968 | A1 | 9/2007 | Snow et al. |
| 2009/0011824 | A1 | 1/2009 | Englman et al. |
| 2009/0088252 | A1 | 4/2009 | Nicely et al. |
| 2009/0093298 | A1 | 4/2009 | Michel |
| 2009/0227309 | A1 | 9/2009 | Yoshizawa |
| 2009/0275389 | A1 | 11/2009 | Englman et al. |
| 2009/0325670 | A1 | 12/2009 | Kelly et al. |
| 2010/0056262 | A1 | 3/2010 | Englman et al. |
| 2010/0075745 | A1 | 3/2010 | Gomez et al. |
| 2010/0137052 | A1 | 6/2010 | Bennett |
| 2010/0197385 | A1 | 8/2010 | Aoki et al. |
| 2010/0216536 | A1 | 8/2010 | Gagner et al. |
| 2010/0291993 | A1 | 11/2010 | Gagner et al. |
| 2013/0296016 | A1 | 11/2013 | Acres |
| 2017/0061734 | A1 | 3/2017 | Acres |
| 2019/0051120 | A1 | 2/2019 | Acres |

FOREIGN PATENT DOCUMENTS

| | | | |
|---|---|---|---|
| CN | 1300989 | A | 6/2001 |
| CN | 1663643 | A | 9/2005 |
| CN | 1827196 | A | 9/2006 |
| CN | 101056681 | A | 10/2007 |
| JP | 10-301475 | | 11/1998 |
| WO | 98/051384 | A1 | 11/1998 |
| WO | WO 98/51384 | A1 | 11/1998 |
| WO | 2002011083 | A2 | 2/2002 |
| WO | WO 02/11083 | A1 | 2/2002 |
| WO | 2003026763 | A1 | 4/2003 |
| WO | Wo 03/026763 | A1 | 4/2003 |
| WO | 2005027060 | A2 | 3/2005 |
| WO | 2005029423 | A1 | 3/2005 |
| WO | WO 2005/027060 | A2 | 3/2005 |
| WO | WO 2005/029423 | A1 | 3/2005 |
| WO | 2006023416 | A2 | 3/2006 |
| WO | 2006023907 | A2 | 3/2006 |
| WO | WO 2006/023416 | A2 | 3/2006 |
| WO | WO 2006/023907 | A2 | 3/2006 |
| WO | 2006036773 | A2 | 4/2006 |
| WO | 2006063054 | A2 | 6/2006 |
| WO | WO 2006/063054 | A2 | 6/2006 |
| WO | 2006078219 | A1 | 7/2006 |
| WO | WO 2006/078219 | A1 | 7/2006 |
| WO | 2006105592 | A1 | 10/2006 |
| WO | 2006118849 | A1 | 11/2006 |
| WO | 2007019381 | A2 | 2/2007 |
| WO | 2007078654 | A2 | 7/2007 |
| WO | 07/093000 | A1 | 8/2007 |

METHOD FOR SHARING GAME PLAY ON AN ELECTRONIC GAMING DEVICE

CROSS REFERENCE TO RELATED APPLICATIONS

This is a continuation of U.S. patent application Ser. No. 15/349,742, filed Nov. 11, 2016, for METHOD FOR SHARING GAME PLAY ON AN ELECTRONIC GAMING DEVICE, which is a divisional of U.S. patent application Ser. No. 13/466,314, filed May 8, 2012, now U.S. Pat. No. 9,530,283, issued Dec. 27, 2016, for METHOD FOR SHARING GAME PLAN ON AN ELECTRONIC GAMING DEVICE, which is a divisional of U.S. patent application Ser. No. 12/167,549, filed Jul. 3, 2008, now U.S. Pat. No. 8,192,267, issued Jun. 5, 2012, for SHARED BONUS ON GAMING DEVICE, the disclosures of which are incorporated herein by reference in their entirety for all purposes.

Commonly Assigned U.S. Patent Applications

U.S. patent application Ser. No. 12/167,525, filed Jul. 3, 2008, for METHOD AND APPARATUS FOR FACILITATING WAGERING BY MULTIPLE PLAYERS OF GAMING MACHINES, now abandoned; U.S. patent application Ser. No. 12/167,535, filed Jul. 3, 2008, for METHOD OF ALLOCATING CREDITS FOR GAMING DEVICES, now abandoned; U.S. patent application Ser. No. 12/167,584, filed Jul. 3, 2008, for SHARED BONUS ON GAMING DEVICE, now abandoned.

The disclosures of the above-listed applications are all incorporated herein by reference in their entirety for all purposes.

FIELD OF THE INVENTION

This disclosure relates generally to electronic gaming devices, and more particularly to electronic gaming devices that facilitate wagering by multiple players on a single gaming device.

BACKGROUND AND SUMMARY

Gaming has conventionally been a social activity for many players. That is, part of the enjoyment of gaming is sharing an exciting experience with others. This can easily be seen at craps tables, sports books, poker tournaments, and other types of gaming. With electronic gaming devices, such as slot machines, this social interaction can be hampered somewhat by the player-machine setup where individual devices typically support only play by a single player. Although players may select gaming machines adjacent to one another, or adjacent gaming stations at a multi-player electronic table, multiple players, e.g., a couple, may not be able to share a casino gambling experience as much as they might like. For example, if the couple selects adjacent gaming machines to play so that each can keep an eye on the other's betting, playing, and any jackpots or bonuses that might result, they typically cannot participate in the other's gaming experience or even focus on their own gaming experience. While this distraction may prevent the other player from fully engaging with his or her own game, it at least provides some semblance of a shared gaming experience.

Gaming tournaments in which multiple players compete against one another are known. In such tournaments, each player bets his or her own money and competes with other players to see who can win the most. While the tournament format involves multiple players, it is typically based strictly on competition, i.e., each player bets his or her own money on separate games to compete against other players whom they may or may not know. Normally the competitors are distributed in a casino, or—at best—side by side on separate gaming devices. Hence, while gaming tournaments provide some interaction between players, this interaction is limited in its ability to provide a rewarding shared gaming experience. Further, while tournaments provide some semblance of competition, this competition can be tempered by the player's intense focus on his or her own gaming results.

Community betting has also increased in popularity. With community betting, two or more players pool their money to play a single gaming machine. With this technique, the players typically all stand near a single gaming device where they deposit their pooled money and take turns initiating the gaming device. Typically, this type of betting is popular for large jackpot type machines, such as Mega-Bucks®, where a max bet is needed to be eligible for the big prize and the prize is large enough that the players can split any winnings and still feel successful. While community betting provides a shared gaming experience, it can quickly lead to boredom by the player not currently placing the wagers. In addition, the shared gaming experience is usually limited to the bond of the pooled money. Hence, there is usually no direct competition or way to compare the wagering results of one player versus the wagering results of the other players.

To address at least the needs outlined above, the present invention provides a method of sharing game play on an electronic gaming device that has at least two gaming stations. First and second games are initiated with the second game being separate from the first. Each game generates an outcome. Wagers received from a player at each gaming station may be allocated in a variety of ways, including to the outcome of the first game, the outcome of the second game, to both, or to the better of the first game outcome and the second game outcome. Combinations of the foregoing allocations are also possible.

DETAILED DESCRIPTION

Embodiments of the present concept provide an electronic gaming device that enables a shared gaming experience by facilitating wagering by multiple players on a single gaming device. In one embodiment, a gaming device includes a first station to accommodate a first player, a second station to accommodate a second player, and at least one display for displaying game outcomes at both the first and second stations. The gaming device may include a common meter that stores credits available for wagering at the first and second station, or may include separate meters for displaying credits or scores for each gaming station.

In one aspect of the present development, a single game having a wide video screen, such as an LCD or plasma display, includes a pair of stations—one for each player—in front of the screen. One player may be stationed in front of the left half of the screen and the other in front of the right half. Alternatively, two separate screens may be used. In either situation, a double wide chair or two separate seats may be provided so that each player is positioned in front of each station.

The gaming machine may be implemented to permit each player to play separate games. For example, each player may play a separate video poker game in which each player wagers and initiates a game, using separate control buttons, at his or her own pace regardless of the rate of wagering and playing by the other player, i.e., the gaming is asynchronous. Or there may be a common game initiation, via a single control button, but with separate outcomes displayed, one on each screen.

In another aspect, the players fund the bets from a single pool of money, which may be implemented by a single credit meter on the gaming machine. The wager for each player could be identical or different from one another. Any winnings, e.g., from jackpots or bonuses, could go to a single winning pool, such as the credit meter that funds the bets. Alternatively, each player could have a jackpot meter upon which wins from the respective games are stored.

Figure 1A:
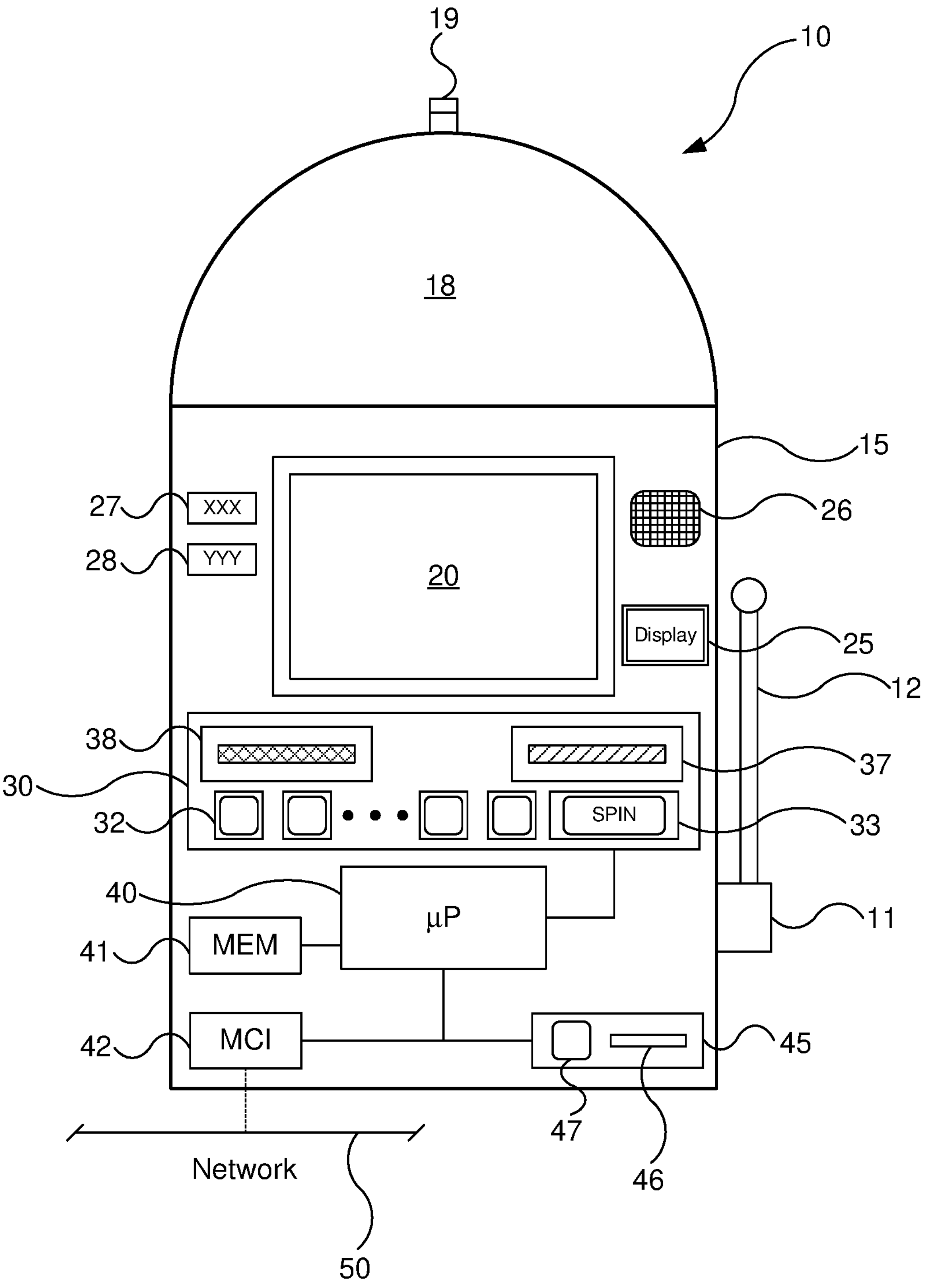
FIG. 1A is a functional block diagram that illustrates a gaming device according to embodiments of the invention.
Figure 1B:
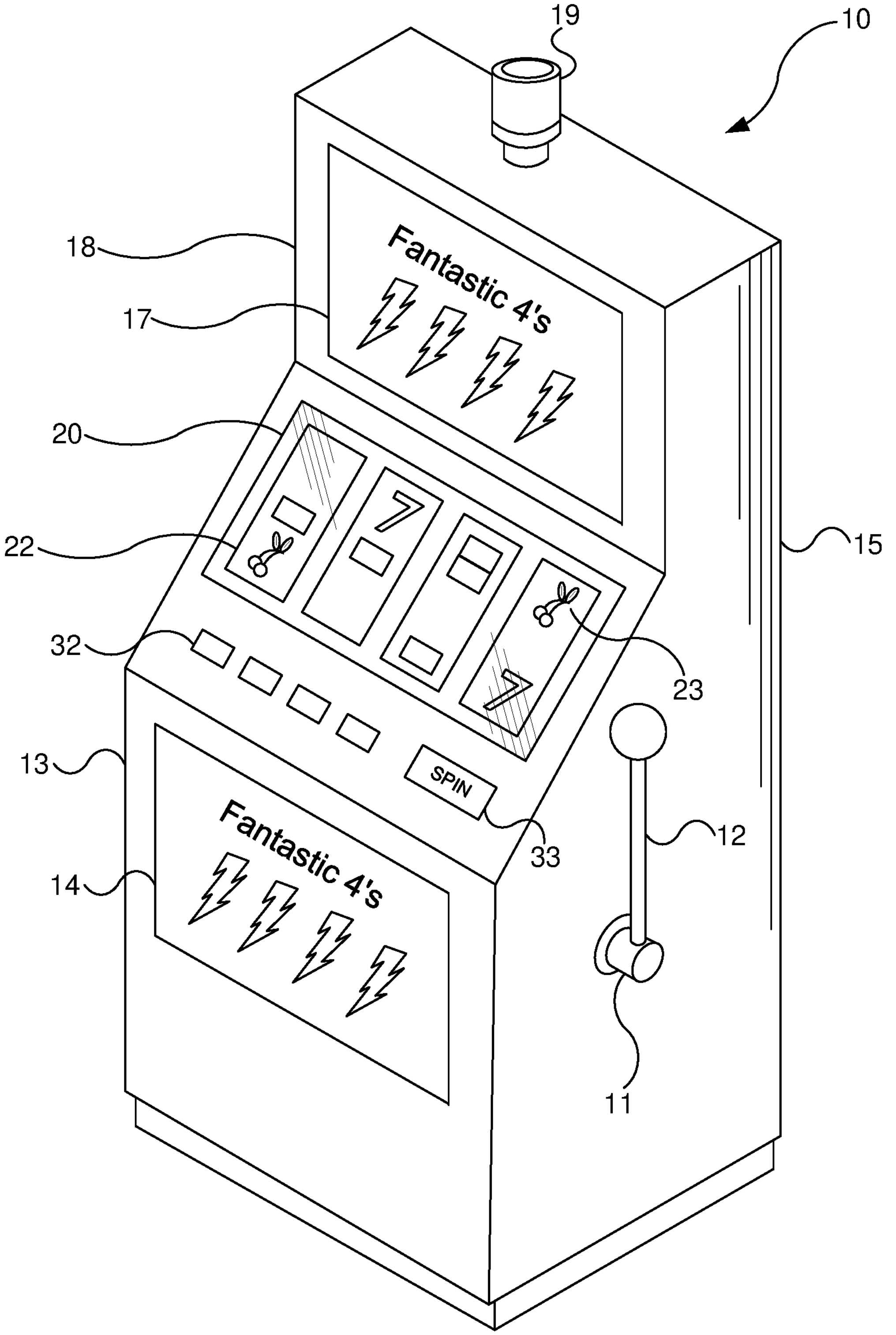
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
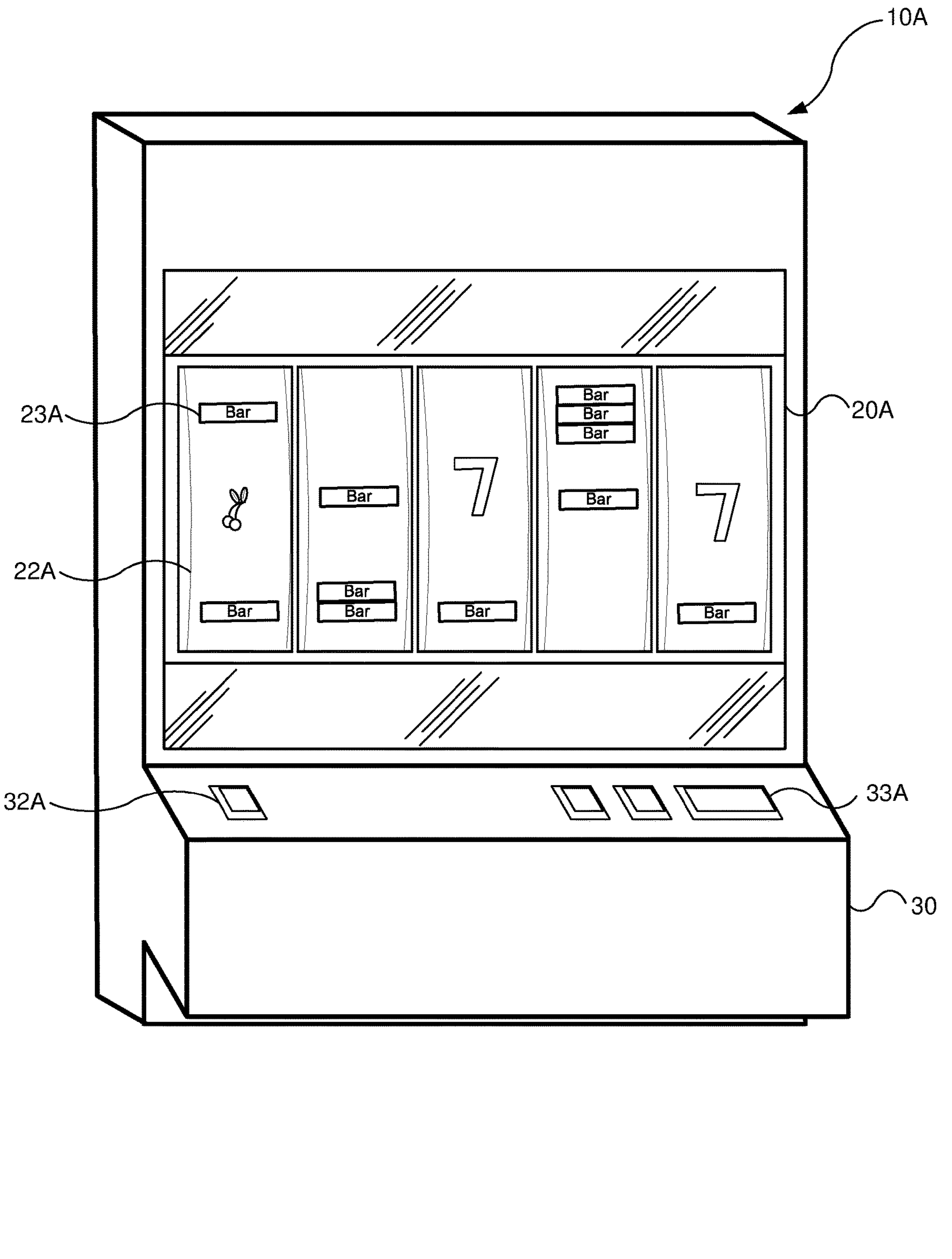
FIGS. 2A, 2B, and 2C are detail diagrams of exemplary types of gaming devices according to embodiments of the invention.
Figure 2B:
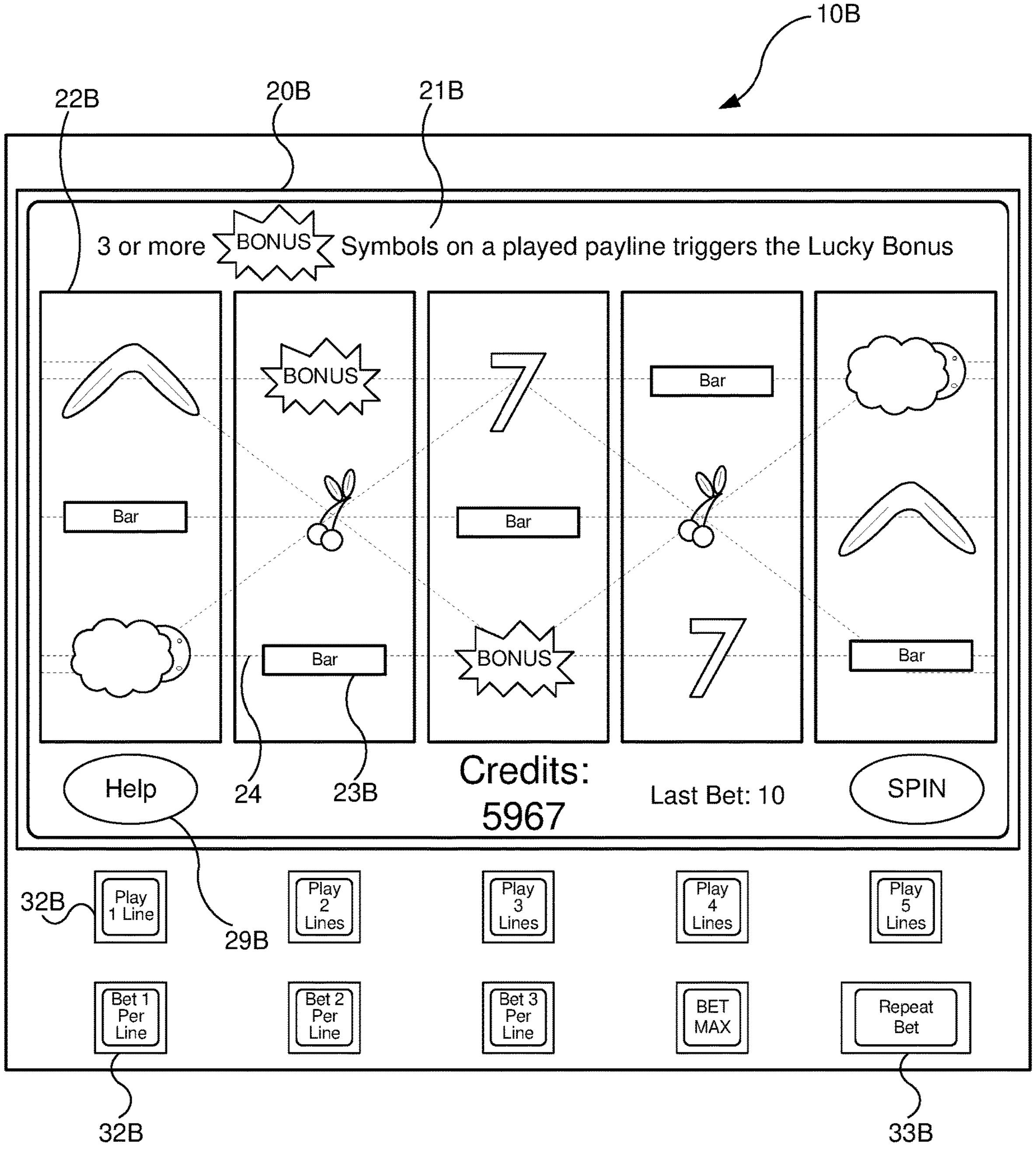
Figure 2C:
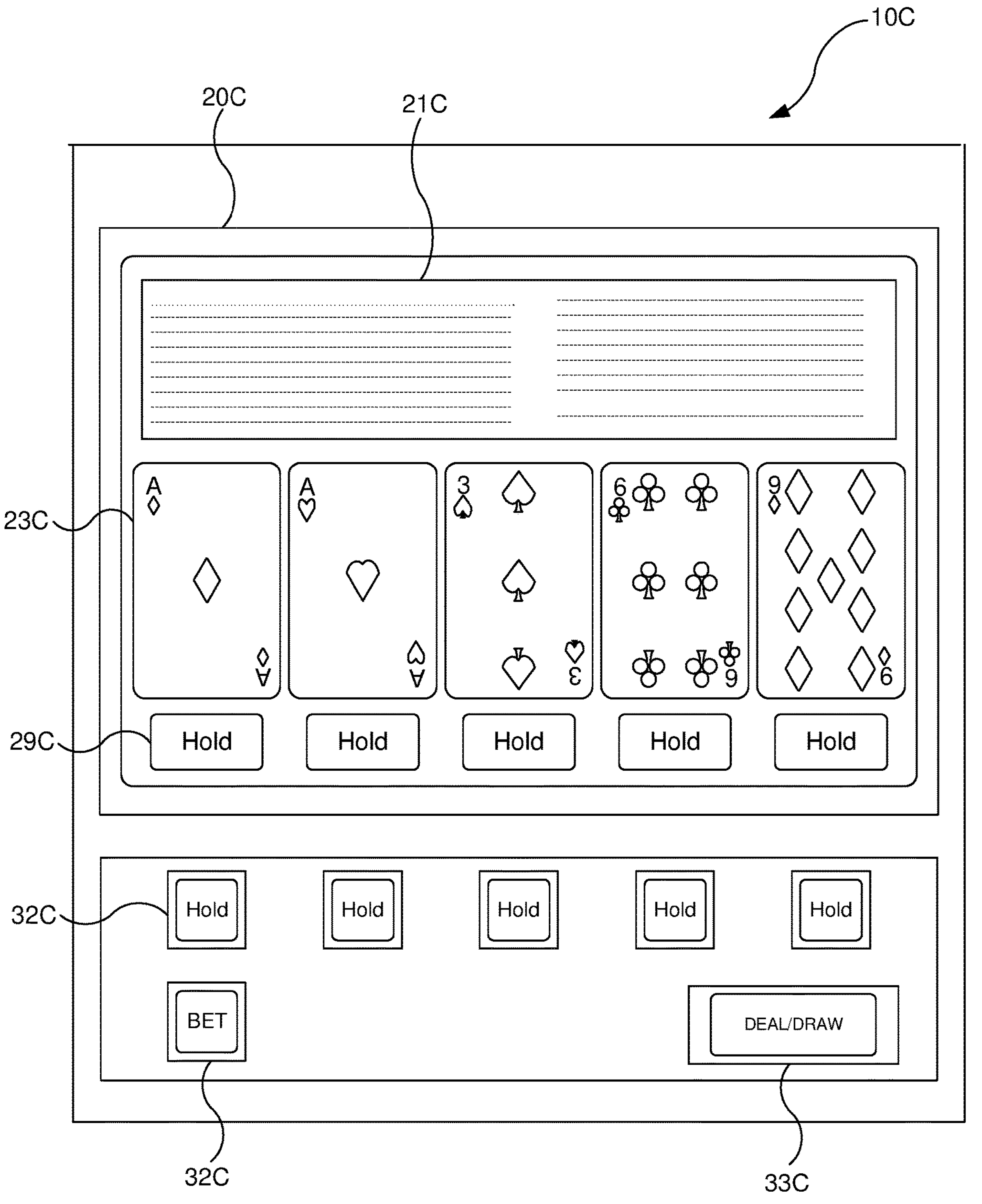

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five-line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
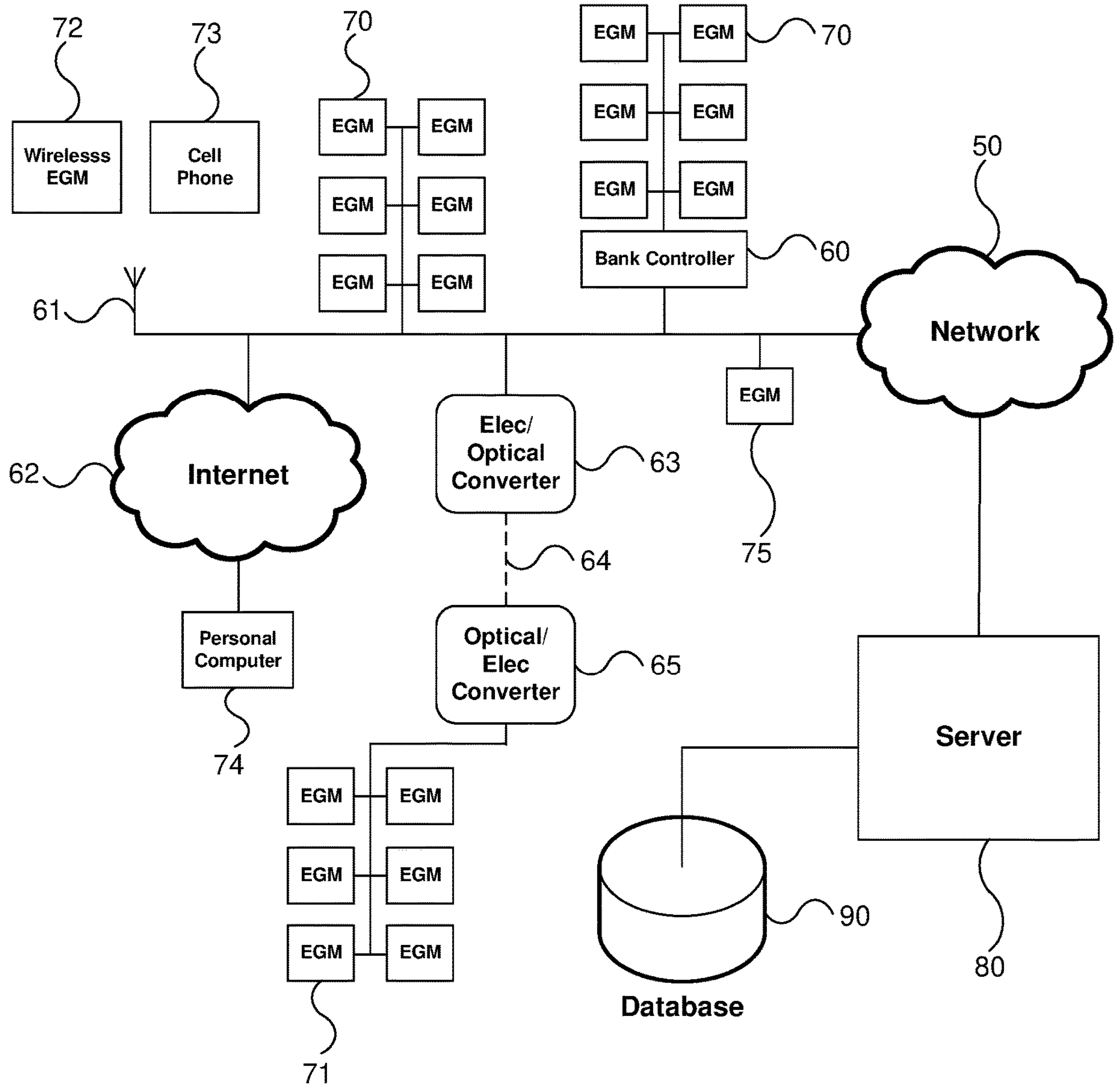
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
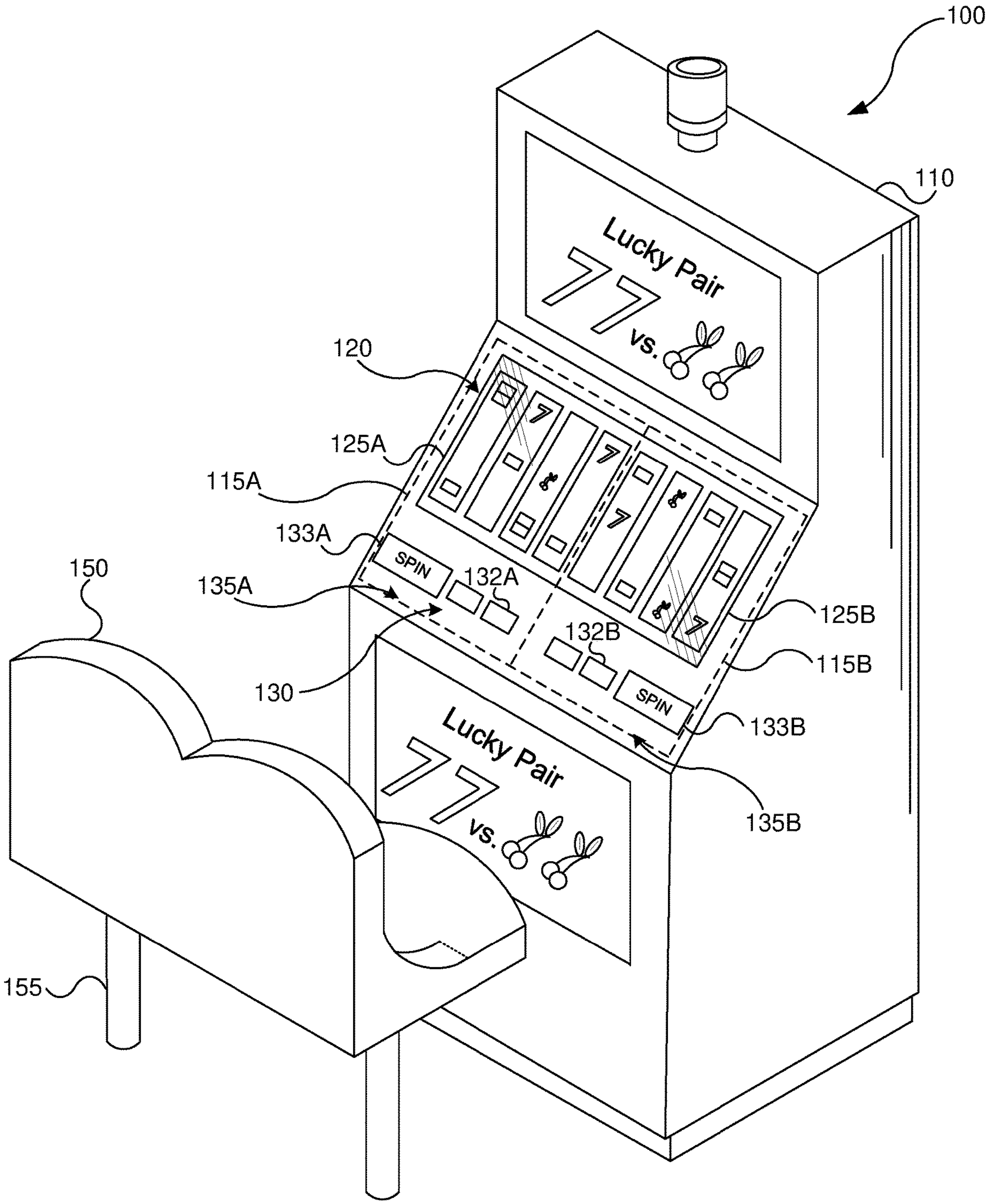
FIG. 4 is an isometric view of a gaming device according to embodiments of the invention.

FIG. 4 is an isometric view of a gaming device according to embodiments of the invention.

Referring to FIG. 4, a gaming device 100 may include a gaming cabinet 110 that has multiple player stations to facilitate wagering by multiple players. That is, the gaming cabinet 110 of the gaming device 100 may include a display 120 and a player interface panel 130 that are both configured into multiple gaming stations. In the embodiment shown in FIG. 4, a first gaming station 115A may include a first display portion 125A and a first player interface panel 135A, while a second gaming station 115B may include a second display portion 125B and a second player interface panel 135B. Here, the first gaming station 115A corresponds to the left-side portion of the gaming device 100, and the second gaming station 115B corresponds to the right-side portion of the gaming device 100. This correspondence, however, is exemplary only and may be reversed in other embodiments. Further, although only two gaming stations are shown for the gaming device 100 in FIG. 4, additional gaming stations may be present in other embodiments.

Figure 6:
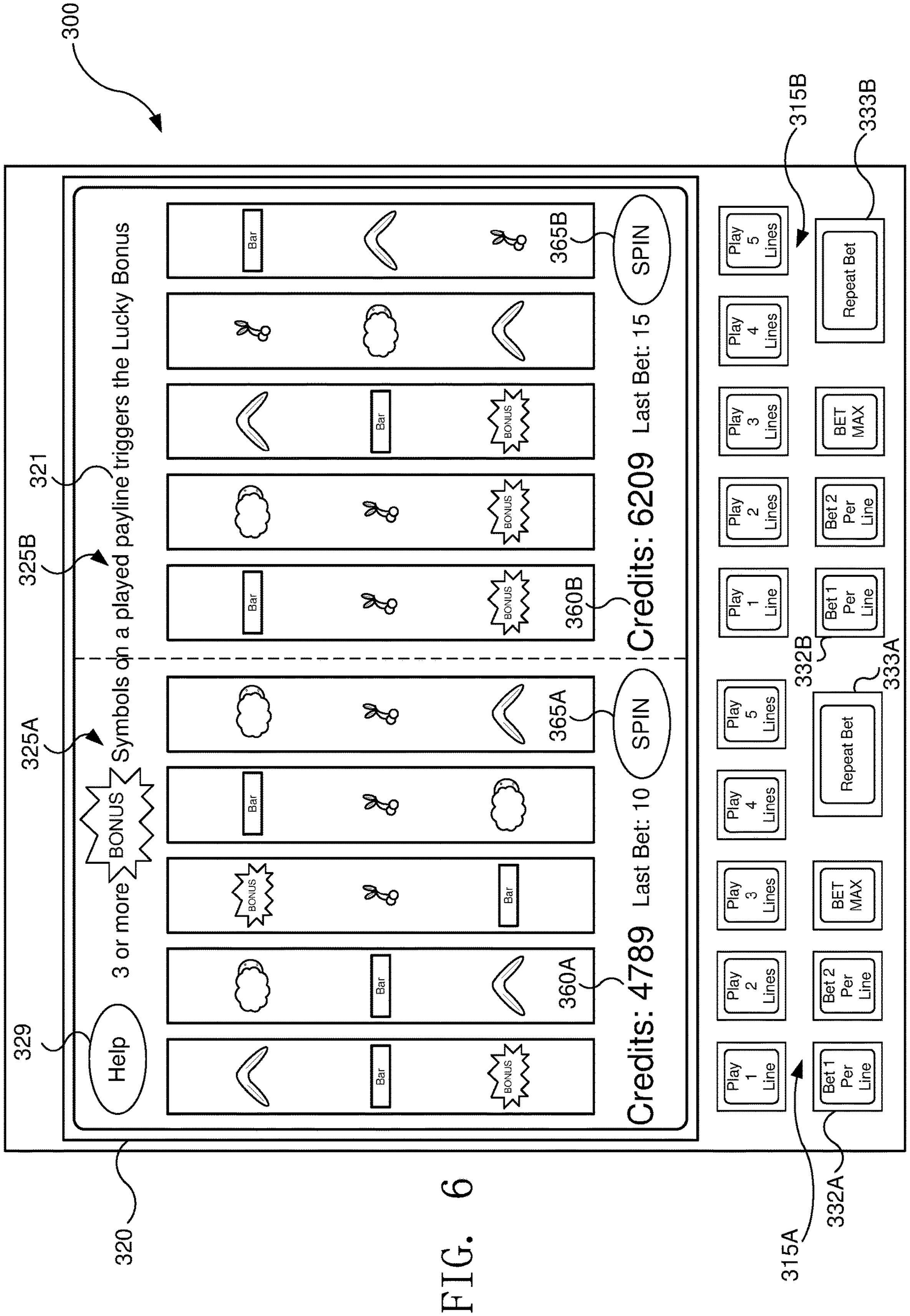
Figure 7:
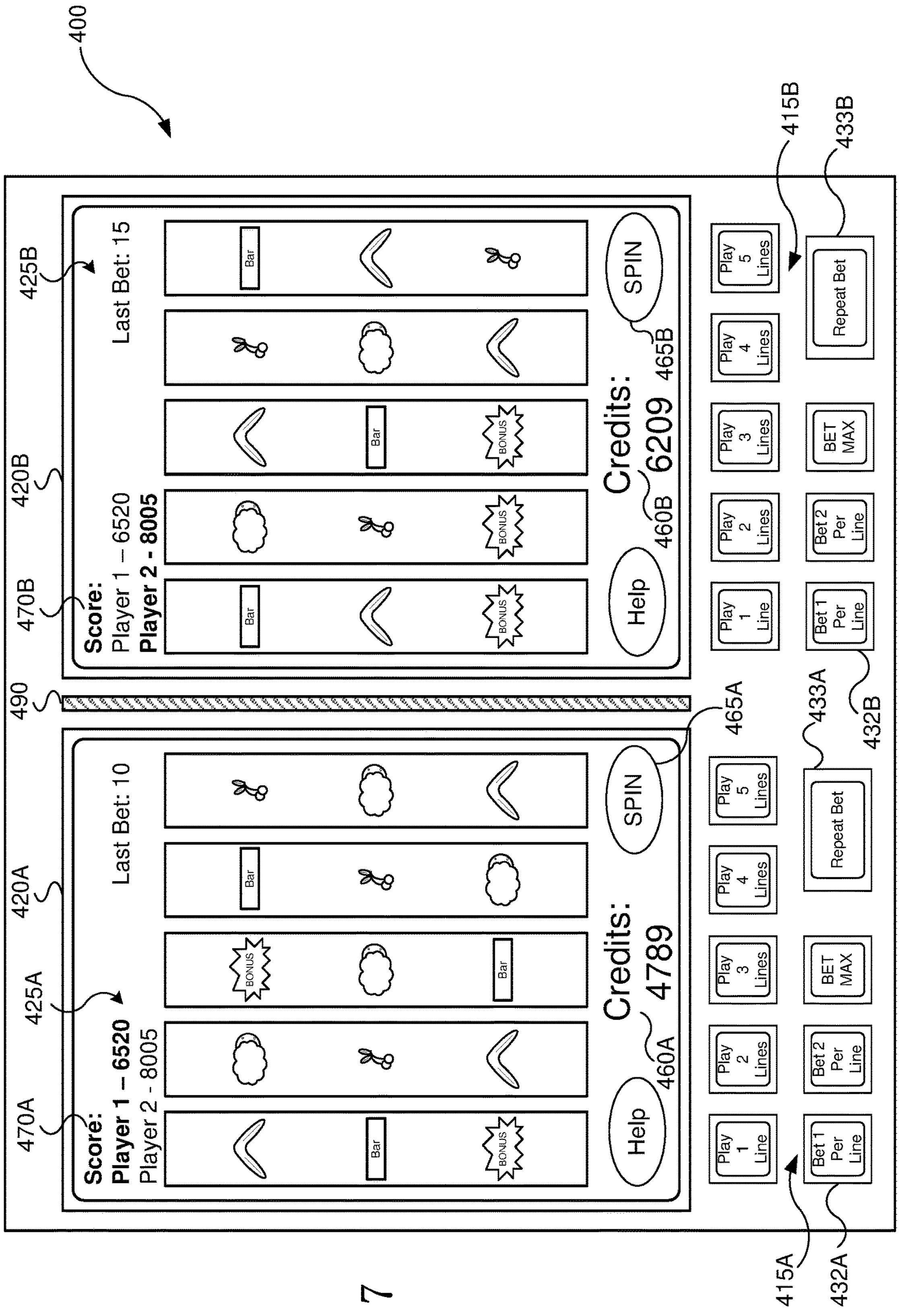

The gaming display 120 may include a single widescreen display unit (FIGS. 5 and 6) or separate display units (FIG. 7). As discussed above, the gaming display 120 includes a first display portion 125A and a second display portion 125B that respectively correspond to the first gaming station 115A and second gaming station 115B. If the gaming display 120 is a single widescreen display unit, the first and second display portions 125A and 125B may respectively correspond to the left and right halves of the gaming display. In some embodiments (FIG. 6), the gaming display 120 may be partitioned into two display areas (i.e., the first and second display portions 125A and 125B) that each display a separate game playable by different players. Alternatively, in other embodiments (FIG. 5), the gaming display 120 may display a common game where the first and second display portions 125A and 125B simply correspond to respective sides of the gaming display 120 that may contain player specific information. Some of the various configurations of the gaming display 120 will be discussed in further detail below in the embodiments illustrated in FIGS. 5-7.

The player interface panel 130 may include a plurality of buttons 132A, 133A, 132B, and 133B that are configured into a first player interface panel 135A and a second player interface panel 135B. Because the first and second player interface panels 135A, 135B are configured to facilitate separate wagering by two players, some of the buttons 132A, 133A, 132B, and 133B may perform similar functions for the respective gaming station with which it corresponds. For example, the first player interface panel 135A may include one or more game buttons 132A and a game initiating button 133A. Likewise, the second player interface panel 135B may include one or more game buttons 132B and a game initiating button 133B. Since the game buttons 132A and 132B include wagering buttons, such as a "bet-one" button and/or a "max bet" button, some of the game buttons 132A that correspond to the first player station 115A will be similar to the game buttons 132B that correspond to the second player station 115B. Other game buttons 132A and 132B, however, may not need to be functionally duplicated for the separate gaming stations because only one such button for the gaming device 100 is necessary. Examples of these types of buttons include a "cash out" button or a "change"/"help" button. Each of the first and second player interface panels 135A and 135B may include a game initiating button 133A and 133B, respectively, to allow each of the players to wager on the gaming device 100. However, in other embodiments, each player station may share game buttons 32B and/or a game initiation button 33B (FIG. 2B) such that the layout of the player interface panel may be similar in some respects to a single station gaming device. In some of these embodiments game buttons 32B may be shared while the game includes first and second game initiation buttons 233A, 233B. As described in reference to FIGS. 2A-2C, the particular layout and function of the buttons 32A, 33A, 32B, and 33B will depend largely on the type of gaming device 100 being played.

The gaming device 100 may also include one or more seats 150. In the embodiment illustrated in FIG. 4, the gaming device 100 includes a double seat 150 that can accommodate two players. In other embodiments, however, the gaming device 100 may include two separate chairs or stools. In either type of embodiment, each player is preferably positioned in front of a gaming station 115A or 115B to allow for a comfortable playing environment. The double seat 150 shown in FIG. 4 includes two supports 155 for stability. Other embodiments, however, may include only one support 155 or additional supports 155.

The gaming device may have multiple player tracking units (45 in FIG. 1) with multiple card readers (46 in FIG. 1) or may utilize a single player tracking unit 45 with a card reader 46 that keeps player tracking data after each player has inserted and removed his or her player card. The players may be able to use the one or more buttons (47 in FIG. 1) associated with the player tracking unit 45 to assign a particular player tracking card to a particular gaming station 115A and 115B. This may ensure that each player gets credit for their wagering activities. Alternatively, the gaming device 100 may only accept a single player tracking card and simply credit the wagering activity from both players on the single player account. In this situation, players may choose to switch which player card in inserted is the gaming device 100 after a certain time period or amount wagered.

It is also noted, that these embodiments of gaming devices facilitating wagering by multiple players may be playable by a single player. That is, to prevent the gaming device from going unused when only one person is looking to play it, the gaming device may be played in a single player mode using one of the gaming stations 115A, 115B in a similar manner to a conventional gaming device. When a single player is playing the gaming device 100, a second player may join. If the casino chooses to encourage multiple players to play the gaming device 100, the casino may choose to implement game play on the gaming device that gives a better pay back percentage when there are multiple players playing the gaming device 100. One method of implementing a better pay back percentage is to have shared bonuses available with higher average payouts, or have random bonuses occur more frequently when there are multiple players playing the gaming device 100.

In other embodiments, a single player may be enabled or even encouraged to play both gaming stations. Since some players play multiple adjacent gaming devices substantially simultaneously, these embodiments would allow such players to play multiple games on a single gaming device. In further embodiments, a single game initiation button 133A or 133B may be configured to initiate games at both gaming stations 115A, 115B substantially simultaneously. Credits awarded on each of the gaming stations 115A, 115B may be transferred to a single credit meter or may be kept separate to promote the feeling of playing two separate games.

The configuration of the gaming device 100 into multiple gaming stations 115A, 115B allows players to play independently on separate games on the same gaming device 100, as well as allowing players to play in a more interactive manner through shared displays, common credit meters, shared bonuses, etc. Some of the various features of these configurations are described in further detail below.

Figure 5:
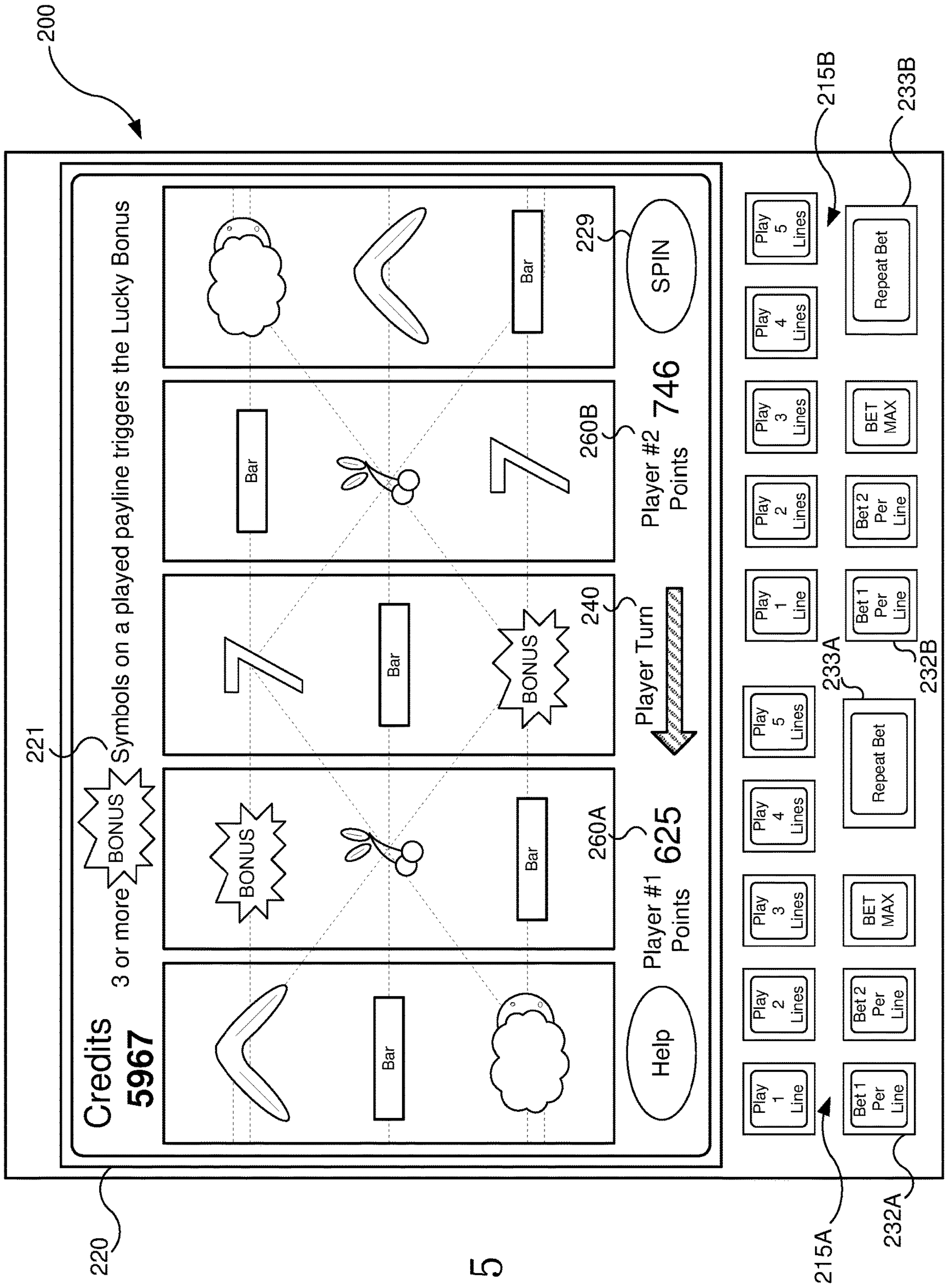
FIGS. 5-7 are detail diagrams of exemplary types of gaming devices according to embodiments of the invention.

FIGS. 5-7 are detail diagrams of exemplary types of gaming devices according to embodiments of the invention. FIG. 5 illustrates a gaming device 200 with a common display, FIG. 6 illustrates a gaming device 300 with a partitioned display, and FIG. 7 illustrates a gaming device 400 with separate displays.

Referring to FIG. 5, the gaming device 200 includes a common display 220, a first gaming station 215A, and a second gaming station 215B. In the embodiment shown in FIG. 5, the common display 220 is a video display. However, in a spinning reel slot machine (e.g., FIG. 2A) the common display 220 may include a plurality of spinning reels. The common display 220 may display a single base game, such as a video slot game or a video poker game. In addition, the common display 220 may show player information 221 common to both players, such as a banner or a common credit meter. The common display 220 may also include common soft buttons 229 to interact with the gaming device.

The common display 220 may, however, include player specific information, such as individual player scores 260A, 260B and a player turn indicator 240. These player specific items may correspond to the first and second player stations 215A and 215B. That is, the player 1 score 260A may be positioned on the side of the common display 220 corresponding to the first player station 215A, while the player 2 score 260B may be positioned on an opposite side of the common display 220 corresponding to the second player station 215B. Each of the first and second player stations 215A, 215B may include game buttons 232A, 232B and game initiating buttons 233A, 233B.

In operation, the gaming device 200 may allow a player at the first player station 215A and a player at the second player station 215B to alternately play the base game that appears on the common display 220. For example, player 1 may start the wagering by choosing to play five lines at one credit per line and pushing the game initiating button 233A in the first player station 215A. The credits bet by player 1 (in this case, five) may be deducted from a common credit meter (part of the player information 221) or from an individual credit meter (FIG. 6). If the wager made by player 1 results in a win, either the common credit meter 221 or player 1's individual credit meter is incremented by the amount of the wagering win.

In addition, events that happen during player 1's wager may accumulate points on the player 1 point meter 260A. Similarly, events that occur during player 2's wager may accumulate points on the player 2 point meter 260B. This way, if a common credit meter is used, the players have an opportunity to compare the relative success each has had against the other. The scores shown on the player 1 point meter 260A and the player 2 point meter 260B may be based on a comparison of the respective player's payback versus the theoretical payback percentage of the gaming device 200. In addition, a normalized scoring scheme may be used to normalize the scores shown on the player 1 point meter 260A and the player 2 point meter 260B so that scores based on the relative wagering success of each player can be compared irrespective of amounts wagered, the respective wagering rate, etc. For example, one normalizing scoring scheme may include dividing an amount awarded by an amount wagered in generating a player score.

After player 1 has completed a gaming session, the player indicator 240 may change to indicate that it is player 2's turn to wager. In addition to having the player indicator 240 indicate which player is allowed to wager, the game buttons 232B and game initiating button 233B corresponding to the second player station 215B may become illuminated and activated while the game buttons 232A and game initiating button 233A corresponding to the first player station 215A may have any back lighting turned off and become inactive. That is, even if player 1 attempts to wager during player 2's turn, he or she will be unable to place a wager using the buttons associated with the first player station 215A. After player 2 has placed a wager and completed a gaming session, the player indicator 240 may again indicate that it is player 1's turn and the button illumination and activation procedure may be reversed.

Although the above operational example indicates that player 1 and player 2 switch wagering turns after each gaming session, multiple gaming sessions by each player may be implemented with each player's turn. In addition, the number of gaming sessions per turn may be varied by casino personnel, by the players themselves, or set through a player preference setting associated with the player tracking information. Further, the number of gaming sessions per turn may not necessarily be equal. For example, the gaming device 200 may be set so that player 1 receives three wagering opportunities per turn while player 2 receives only one opportunity. This may allow players to contribute different amounts of money to a common credit meter and wager a corresponding percentage of the time. In the above example (where player 1 gets three turns to every one for player 2), player 1 may have contributed $75.00 to the common credit meter while player 2 contributed $25.00.

Further, although FIG. 5 shows that the player point meters 260A, 260B, credit meter 221 and player indicator 240 are displayed on the common display 220, separate credit meters (such as 27 and 28 in FIG. 1) and/or a mechanical indicator (not shown) may be implemented in other embodiments.

Bonuses awarded during a gaming session may be played by the player who triggered the bonus or had the turn when the bonus was awarded. For example, if player 1 triggered a second screen bonus during a gaming session, player 1 would get to play the bonus or at least get any award from the bonus credited to his or her player point meter 260A or individual credit meter. In other embodiments, however, a bonus triggered by one player may provide a bonus that is interactive for both players. That is, a bonus may be triggered that requires interaction by both players. This dual-player interactive bonus may be preferable because it keeps both players involved in the gaming experience. These dual-player interactive bonuses may include bonuses where both players are competing for prizes, bonuses where both players are cooperating to achieve a bonus goal, or bonuses where the non-triggering player can place a side bet on whether the triggering player reaches a certain bonus threshold. In some embodiments, a non-triggering player may be able to participate in an interactive bonus, but the credits earned by the non-triggering player will be added to the triggering player's credit meter. That is, the interactive bonus may allow both players to be involved in a bonus while only providing credits to a triggering one of the players. In other embodiments, an interactive bonus may be configured so that when one player triggers the bonus, the other player plays the bonus. The credits awarded in the bonus may still be credited to the triggering player's credit meter. The interactive bonus procedure is described in additional detail below with reference to FIG. 9 and exemplary dual-player interactive bonuses are described below with reference to FIGS. 10A-10C.

As mentioned above, it may be advantageous to have player score meters 460A and 460B to keep track of the players wagering results. The scoring may be based primarily on the total wins for each player. Other scoring, besides total win, could be kept, however. Such scoring could be win based, but not based on total win, or could be based on activity other than wins. For example, some scoring/award could be offered if both players achieve specific outcomes back to back. In another version, players could work in tandem to accomplish a specific goal, such as completing a bonus game. In another version, scoring could be determined by how much each player won as a percentage of total wagers made. For example, if Mary wins $130 on $170 of wagers, her score is 130/170*100=76. Ted wins $150 on $210 wagered but has a score of 150/210*100=71, therefore Mary wins even though Ted won more in jackpots. These scoring procedures may instill a sense of competition between friendly players.

Referring to FIG. 6, the gaming device 300 includes a display 320 that is partitioned into a first display portion 325A and a second display portion 325B. The first display portion 325A and the second display portion 325B respectively correspond to the first gaming station 315A and the second gaming station 315B. The partitioning of the display 320 may be only a virtual partition. That is, the display 320 may be capable of displaying single screen images. This capability may be useful in displaying "see pays" or "help screens" that are useful to both players. Additionally, second screen bonuses may be conducted as single screen cooperative or dual-player interactive bonuses. Thus, while the base games at each player station 315A and 315B may be separate, a cooperative bonus triggered by either player or the gaming device 300 may be carried out on the full display screen 320. Additionally, common player information 321, such as banners may be displayed using both portions 325A and 325B of the display 320. Some soft buttons 329 that are not used in wagering, or rarely used, such as a "help button" may appear on only one portion of the display 320. On the other hand, soft buttons 365A, 365B that are used during wagering, such as a "spin" button may appear on each portion 325A and 325B of the display 320. Again, each player interface panel of each gaming station 315A and 315B may include game buttons 332A, 332B and game initiating buttons 333A, 333B.

As shown in FIG. 6, each player station 315A, 315B may have a respective credit meter 360A, 360B. Having separate credit meters 315A, 315B may allow players who play at different speeds or use different wagering amounts to use equal shares of any inputted credits. For example, if 5000 credits were input into the gaming device 300 and split evenly between the two players, each player would have 2500 credits to wager. This may prevent a situation on a common credit meter where a player playing max bet uses a larger percentage of the credits on the common credit meter than another player who is playing less than max bet. Additional details about splitting credits input into the gaming device 300 are discussed below with reference to FIGS. 8A-8C.

In operation, the gaming device 300 using a partitioned display 320 may allow each player to wager on separate base games. In some embodiments, the base games may be similar in theme. In other embodiments, however, each player may have the opportunity to select a theme they would like to play on their player station. For example, a player on the first player station 315A may choose to play a video slot machine with a tropical theme while another player on the second player station 315B may choose to play a video keno game. If the players are playing a similar type of game, the gaming device 300 may be configured to carry out the gaming sessions substantially simultaneously after each player has placed a wager at their respective gaming station 315A, 315B. This configuration may be preferable to heighten competition between players since the outcome of each gaming session can be immediately and directly compared between the players. Alternatively, the gaming device 300 may be configured to allow each player to play at a rate that is comfortable to them. In other words, each gaming session on the player stations 315A, 315B may be substantially independent of each other in timing.

Some embodiments may take advantage of having gaming sessions configured to occur substantially simultaneously by allowing each of the multiple players to place multiple bets on the outcomes of the gaming sessions. For example, in a gaming station 300 that includes a first player station 315A and a second player station 315B, a first player at the first player station 315A may be able to place a wager on the game outcome at the first player station 315A and on the game at the second player station 315B. Additionally, the first player may be able to place an additional wager on the better of the two game outcomes at the first and second player stations 315A and 315B. When making a wager on the better of the two game outcomes, the amount of the wager may be higher than a wager on a single gaming station because of the better odds afforded to the player.

In other embodiments, each of the first and second players may be limited to placing only one wager, but may have several options as to where and how they place that wager. For example, a first player at a first player station 315A may place the wager on the game outcome at the first player station 315A, on the game outcome at the second player station 315B, or on the better of the two game outcomes at the first and second player station 315A, 315B. Again, the wager on the better of the two game outcomes may require an additional wager amount or side bet to be made. In these embodiments, it may still be preferable to have the gaming sessions occur substantially simultaneously so that the wagering and game outcomes are relatively synchronized.

Implementing a gaming device 300 to include each of the wagering possibilities above may result in each player having up to seven different possible wagers that may be made at the gaming device 300 when the gaming device 300 includes two player stations 315A, 315B. Table 1 below sets out each of these options (the symbol "Δ" means the better of the game outcomes from the first and second player stations 315A, 315B):

TABLE 1

| | Own Player Station | Other Player Station | Better Player Station | Both Player Stations | Own Station & Better | Other Station & Better | Super Combo Wager |
|---|---|---|---|---|---|---|---|
| Player 1 | 1 | 2 | Δ | 1 + 2 | 1 + Δ | 2 + Δ | 1 + 2 + Δ |
| Player 2 | 2 | 1 | Δ | 2 + 1 | 2 + Δ | 1 + Δ | 2 + 1 + Δ |

The gaming device 300 may be configured to allow some or all of these possible wagers. Some casinos may find it more advantageous to limit the types of wagers that can be made on the gaming device 300 to avoid player confusion, while other casinos may choose to allow all of the different types of wagers to give players a wide variety of wagering options at the gaming device. Having a wide variety of wagering options may make the gaming device more appealing to experienced players because of the different wagering combinations possible. Further, giving players the ability to place multiple wagers may allow players to place larger bets when they feel that one player station or both player stations are "hot." For example, if a player at the second player station 315B acquires several winning outcomes in a row, the player at the first player station 315A may wish to place a wager on the outcome at the second player station 315B since it appears that the second player station may be "hot" or on a winning streak.

In some embodiments the base games at each player station 315A, 315B may be linked. For example, in a video slot embodiment, the gaming sessions may be configured to initiate substantially simultaneously so that the reel spins at each player station are substantially synchronized. After all of the reels have stopped, additional bonus pays may be given to the players for having similar winning combinations or for having a super line pay/super scatter pay. The similar winning combination bonuses may include situations where each player has a line pay including the same symbols (e.g., both player 1 and player 2 have a three symbol cherry pay), each player has a certain number of wins (e.g., both player 1 and 2 have 4 paying lines), each player has over a certain win amount (e.g., both player 1 and 2 have win totals over 500 credits), or each player has a certain number of symbols in a win (e.g., both player 1 and 2 have a five symbol pay). The super line pay/super scatter pay bonuses may include situations where reels from both of the player stations 315A, 315B are used in a win. For example, if reels 3, 4, and 5 of the first player station 315A (the left gaming station) have a cherry symbol on a middle pay line and reels 1 and 2 of the second player station 315B (the right gaming station) have a cherry symbol on a middle pay line (see FIG. 6, for example), a bonus could be given for getting a combined five symbol cherry pay on a super pay line using both player stations 315A, 315B. In another example, if a scatter symbol, such as the boomerang symbols in FIG. 6 appeared on both display portions 325A, 325B a predetermined number of times (e.g., six or more times), an additional bonus may be given to each player.

In another embodiment, players could be given identical hands in video poker, but have the option to 'hold' different cards before the draw. This embodiment may enhance the competitive nature of the game since the players will be given equal initial cards; thus relying on their personal strategy of card holding to determine which player ends up with more credits. In some embodiments, the redraws for each hand may be from the same deck and hence may differ only by the specific cards held by each player. For example, if each player were initially given a hand of "Jack" "10" "4" "6" "4", and player 1 decided to hold the "Jack" and draw for the other four cards, while player 2 decided to hold the two "4"s and draw three cards, the result may look something like that illustrated in Table 2.

TABLE 2

| | Card #1 | Card #2 | Card #3 | Card #4 | Card #5 |
|---|---|---|---|---|---|
| Player #1 | Jack (held) | 10 | 4 | 6 | 4 |
| Player #2 | Jack | 10 | 4 (held) | 6 | 4 (held) |
| Player #1 - After Draw | Jack (held) | 8 | 4 | Jack | Queen |
| Player #2 - After Draw | 8 | 4 | 4 (held) | Jack | 4 (held) |

Note that the same cards in the same order were given to each player in this embodiment. That is, on the draw the cards "8" "4" "Jack" "Queen" were dealt in that order to each player. This embodiment may provide competition that varies only by each player's decisions regarding which cards to hold before the draw.

In other embodiments, however, while the initial cards may be the same for each player, the cards shown after the draw may come from separate decks. This embodiment is more similar to multi-hand poker games, such as DOUBLE PLAY POKER or TRIPLE PLAY POKER where the initial hand is the same, but each 'hand' draws from a different deck of cards. Using a similar example as above, the results of this embodiment may look something like that illustrated in Table 3.

TABLE 3

| | Card #1 | Card #2 | Card #3 | Card #4 | Card #5 |
|---|---|---|---|---|---|
| Player #1 | Jack (held) | 10 | 4 | 6 | 4 |
| Player #2 | Jack | 10 | 4 (held) | 6 | 4 (held) |
| Player #1 - After Draw | Jack (held) | 2 | Queen | 7 | Jack |
| Player #2 - After Draw | King | 4 | 4 (held) | King | 4 (held) |

Note that different cards are given to each player on the draw (although it is statistically possible in this embodiment that both players receive the same cards). That is, player 1 receives the cards "2" "Queen" "7" "Jack" on the draw while player 2 receives the cards "King" "4" "King" on the draw. This embodiment may allow for larger differences in the credits earned by each player, because each player will have different decks to draw from. Hence, even if two players hold the same cards from the initial hand, they may end up with different final hands and different credit awards.

In yet other embodiments, a video poker game may deal each player a separate or unique poker hand and allow at least one of the players the option of switching hands with another player prior to allowing the players to hold cards and draw replacement cards. In some of these embodiments, an indicator, such as an arrow 240 (FIG. 5) may be implemented to illustrate which of the players has the choice of switching the initially dealt poker hands. For example, if the indicator shows that player 1 has the choice to switch the initial hands, player 1 may be prompted to keep his or her existing hand, or switch cards with player 2. There may also be a time limit in which player 1 must make a decision or a default action, such as each player maintaining their current hand may occur. If player 1 chooses to switch hands with player 2, the poker hands on the respective gaming stations may be switched, after which time each player may hold cards and draw cards. In some embodiments, making the choice to switch hands may result in the indicator 240 changing to show that another player has the choice of switching hands for the next game. Thus, in the example above, the indicator 240 may point to player 2 if player 1 makes the choice to switch hands. On the other hand, if player 1 chooses to keep his or her dealt hand, the indicator may continue to point to player 1. In other words, the ability to switch hands may only change to another player when the player currently with the switching ability makes the choice to switch hands. In other embodiments, however, the indicator may switch between players each hand regardless of whether a player uses a hand switching choice or not. Alternatively, a player may get multiple choices (either a set number of turns or a number of times actually using the switch choice) before the indicator changes to another player.

If the indicator only changes to another player when the player uses the option of switching initial hands, some strategy may be employed by the player to determine when to switch hands. For example, if the player's initial hand is significantly better, about equal, or even a little worse than the other player's initial hand, that player may choose to play their own hand and use the hand-switching option during a later gaming event. However, in some embodiments, there may be a set limit on how long a player can hold the switching option. This set limit may be based on time or number of games played.

In yet another embodiment, each player may have the option to place a side bet or buy the switching option. This additional side bet may be included in a common pool or pot that is awarded to the player with the better final hand (i.e., the hand after the draw has been made). Therefore, if one player opts to buy the switching option and ends up having the better final hand, the side bet turns into a wash because they simply get the credits back from the side bet. However, if that player opts to buy the switching option and ends up not having the better hand, they lose those credits to the other player. If the gaming device is configured so that the players are sharing a common credit meter, additional points may be risked instead of credits for the side bet. In other embodiments, the other player may place a similar side bet to "block" the side bet from the first player trying to buy the switching option. In this scenario, each player's side bet may be put in a common pot and won by the player with the better final hand. In addition, some embodiments may allow a bidding game between the two players as to whether a hand-switch occurs or not. That is, if a first player attempts to buy a switch, a second player may match or exceed the first player's side bet to prevent the switch. The first player may then be given the option to up the side bet, while the second player may again be given another chance to match. As the stakes go higher, it may become more risky for each of the players to continue betting or bidding. Additionally, in embodiments where only the highest bidding player has to front the credits (i.e., risk credits in the common pot), the bidding part of the game may become even more competitive. There may be a bid cap to prevent players from bidding too many credits and/or substantially slowing down game play. If there is a cap on the bidding or the gaming device is configured to only allow one side bet and one reciprocal side bet to block, the blocking player may have final say over whether a switch is made or not made. That is, if a first player attempts to buy a switch by placing a side bet, the second player may block the side bet by matching the first player's side bet. Here, the side bet credits may be returned to each player, may be placed in a common pot awarded to the player with a higher final hand, or may be partially returned and partially entered into a common pot awarded to the player with a higher final hand. By having at least a portion of the side bet entered into a common pot awarded to the player with the higher final hand, the first player may only attempt to switch initial hands when the hands are similarly matched. For example, if the second player has a much better hand, such as drawing an initial flush while the first player has five random cards, the first player may not risk trying to buy a switch because the second player would likely block the switch by placing a similar side bet and likely winning the first player's side bet amount if the flush ends up beating whatever the first player draws. However, if the initial hands are closer, such as the first player drawing an ace (with four lower cards) and the second player drawing a pair of low cards (with three other low cards), then the first and second player have an interesting decision to make in either placing a side bet to switch hands and/or placing a blocking side bet if a switching side bet is made. In other embodiments, a portion of the side bets made by each player may be allocated to the casino or gaming establishment.

Separate side bets may also be made regarding any aspect of gaming to increase the competition among the players. In some embodiments, a side bet pot or pool may be set up on the gaming device such that each player can wager on their respective success or even the other player's success or failure. For example, the players may be able to place a side bet on who wins a 500 credit pay first, who triggers a bonus first, who has a higher score after a predetermined amount of time, who wins a total of $100.00 first, who runs out of credits from an initial credit stake first, who gets the most hands above a straight in a predetermined amount of time, who has a better payback percentage after fifty gaming events, etc. After each player contributes to the side bet pool and an event happens that was wagered upon in the pool, the player who won the side bet may be awarded the total amount of the side bet pool. In other embodiments, however, the gaming device may deduct a small "handling" or "administrative" fee from the pool before awarding the remainder to the winning player.

Different embodiments may allow player's to "buy" a duplicate of the other player's initial hand. This additional wager or side bet may be made before the initial hands are shown, or in some embodiments, may be allowed after the initial hand is shown or a portion of the initial hand is shown. In embodiments where the side bet is allowed after the initial hand is displayed, the ability to place such a side bet to buy a duplicate hand may be restricted to situations where the initial hand does not include a winning combination of cards or a winning combination of cards above a specific value (e.g., a combination with a pay above the amount of the side bet).

Referring to FIG. 7, the gaming device 400 includes a first display 420A and a second display 420B. The first and second displays 420A and 420B are separate displays that are spaced apart on the gaming device 400. This spacing may be very small so that the first and second display 420A and 420B can show image portions 425A, 425B corresponding to a full image displayed across both displays, or the spacing may be relatively large to provide improved viewing angles and comfort at the individual gaming stations 415A and 415B. As compared to the single partitioned display 320 in FIG. 6, the multiple displays 420A and 420B may have more individualized player information on each display 420A, 420B. This individualized player information may include individual credit meters 460A, 460B and individual soft buttons 465A, 465B. Again, each player station 415A, 415B includes separate game buttons 432A, 432B and separate game initiating buttons 433A, 433B.

The more individualized nature of these embodiments having separate displays 420A, 420B may be advantageous in that the layout of the displays may more closely resemble conventional gaming device displays (e.g., be less cluttered) allowing experienced players to feel more comfortable with the display layout. However, it may be preferable to include a player score meter 470A, 470B on each display 420A, 420B to keep the sense of competition between the players.

Bonuses may be implemented in a substantially similar manner to the bonuses described above with respect to the partitioned display 320 illustrated in FIG. 6. The separation of the displays 420A, 420B, however, may allow for different types of competitive bonuses. For example, if a temporary or permanent physical partition 490 is positioned between the displays 420A, 420B, bonuses requiring strategy against the other player may be advantageously implemented. For example, a bonus requiring the matching of turned-over cards (e.g., a positional-memory type of game) may be preferably implemented in a gaming device 400 having separated displays 420A, 420B where the players are competing against each other for the highest bonus score. In another example, a Battle Ship® styled bonus may be implemented where players compete against each other for varying bonus award levels. Similarly, in the linked video poker competition described above, it may be preferable to have separated displays 420A, 420B to obfuscate a poker holding strategy.

Figure 8A:
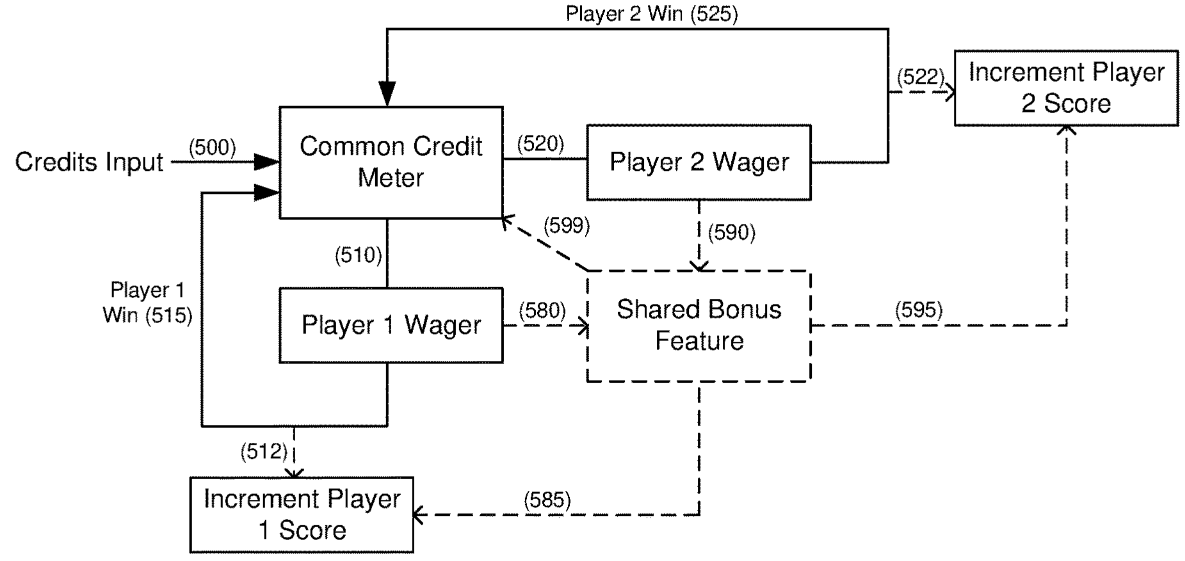
FIGS. 8A, 8B, and 8C are flow diagrams of credit sharing procedures according to embodiments of the invention.
Figure 8B:
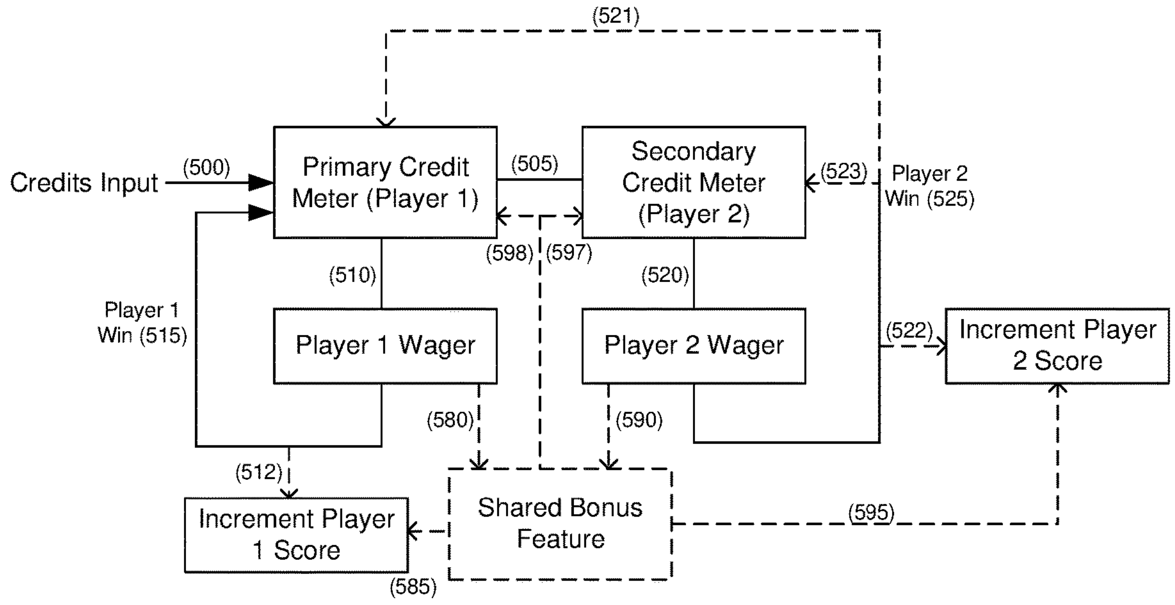
Figure 8C:
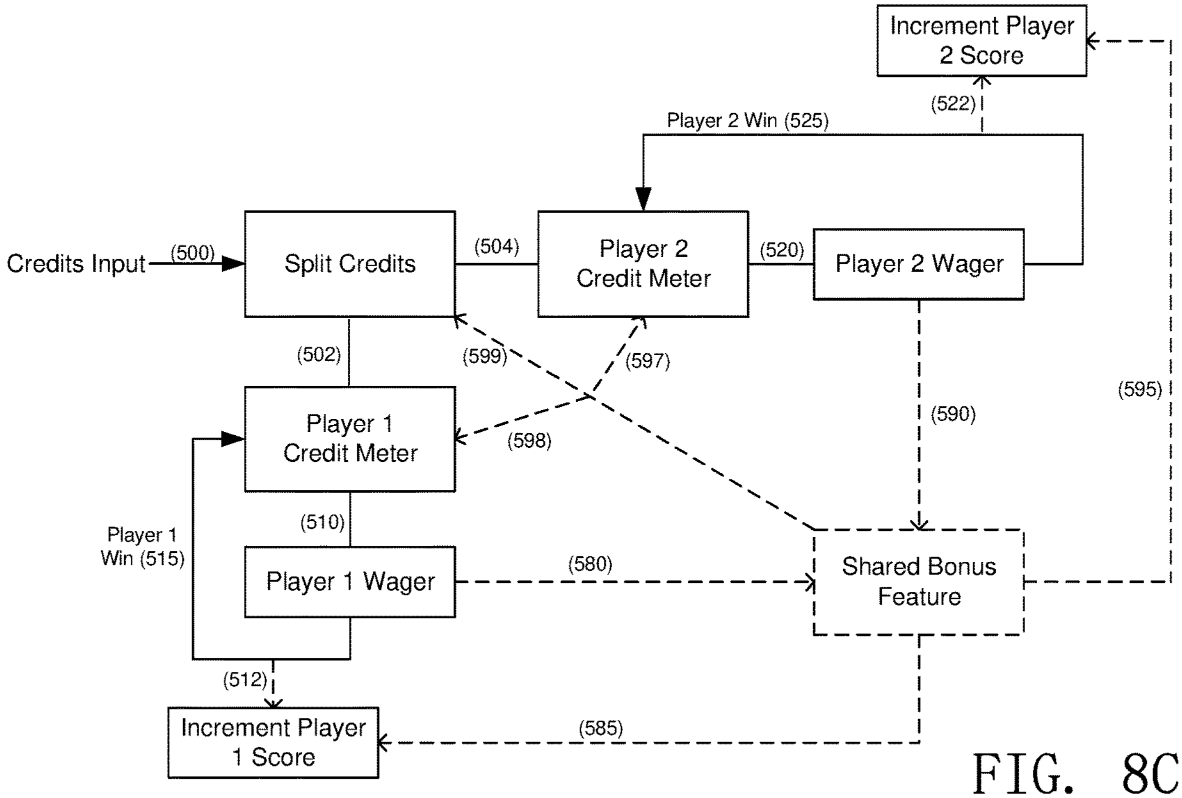

FIGS. 8A, 8B, and 8C are flow diagrams of credit sharing procedures according to embodiments of the invention. FIG. 8A illustrates a credit sharing procedure utilizing a common credit meter, FIG. 8B illustrates a credit sharing procedure utilizing primary and secondary credit meters, and FIG. 8C illustrates a credit sharing procedure utilizing separate credit meters.

Referring to FIG. 8A, the credit sharing procedure utilizing a common credit meter places credits input into the gaming device (500) in the common credit meter. When player 1 places a wager (510), the amount of the wager is deducted from the common credit meter. If the wager placed by player 1 does not result in a win, the credits are simply forfeited in a similar manner to a conventional gaming device. If player 1, however, receives a winning combination in his or her gaming session, the award won by player 1 is transferred back (515) to the common credit meter. If the gaming device is configured to record a player score, a winning gaming session based on player 1's wager may also increment player 1's score (512).

Similarly, when player 2 places a wager (520), the amount of the wager is deducted from the common credit meter. If the wager placed by player 2 does not result in a win, the credits are again simply forfeited. If player 2, however, receives a winning combination in his or her gaming session, the award won by player 2 is transferred back (525) to the common credit meter. If the gaming device is configured to record a player score, a winning gaming session based on player 2's wager may also increment player 2's score (522).

If the gaming device is configured to include shared bonuses (i.e., cooperative bonuses or dual-player interactive bonuses) where both player 1 and player 2 are eligible to receive credits and score points, any credits won from these bonuses will be transferred (599) to the common credit meter and the player scores will be incremented accordingly (585/595). These shared bonuses can be triggered during a gaming session wagered on by either player 1 (580) or player 2 (590).

As discussed above, a credit sharing procedure utilizing a common credit meter may be preferable in embodiments where players are taking turns wagering on a common display (FIG. 5). In addition, a common credit meter may be preferable where the two players are playing with jointly-owned money, such as with a husband and wife. A common credit meter may also foster a more cooperative player environment where each player is rooting for the other to do as well as possible. This shared gaming experience is much more difficult to satisfyingly achieve with conventional gaming devices. Even if separate player scores are kept, any competition will be friendlier because both players are working towards the common goal of increasing the number of credits on the common credit meter as much as possible.

Referring to FIG. 8B, the credit sharing procedure utilizing the primary and secondary credit meters places credits input into the gaming device (500) in the primary credit meter. In the embodiment illustrated in FIG. 8B, the primary credit meter is attributed to player 1. In other embodiments, however, the primary credit mater may be attributed to any of the players. Here, player 1 may be thought of as the pilot and player 2 as the copilot. That is, player 1 may decide how many credits to pass along to the secondary credit meter (505), which is used by player 2.

In operation, wagers placed by player 1 are deducted from the primary credit meter (510) and any awards won by player 1 during the gaming session will be credited back to the primary credit meter (515). In addition, these wins may increment player 1's score meter (512). Wagers placed by player 2 are deducted from the secondary credit meter (520). In some embodiments, awards won by player 2 during the gaming session will be credited back to the secondary credit meter (523). In other embodiments, however, these awards won by player 2 may be credited back to the primary credit meter (521). In both type of embodiments, these wins by player 2 may increment player 2's score meter (522).

If the gaming device is configured to include shared bonuses (i.e., cooperative bonuses or dual-player interactive bonuses) where both player 1 and player 2 are eligible to receive credits and score points, credits won that are attributed to player 1 are transferred to the primary credit meter (598). Credits won in the shared bonus that are attributed to player 2 may, depending on the embodiment of the gaming device, be transferred to the secondary credit meter (597) or to the primary credit meter (598). The player scores, however, may be incremented according to each of the player's performance/results from the bonus (585/595). As mentioned above, these shared bonuses can be triggered during a gaming session wagered on by either player 1 (580) or player 2 (590).

This credit sharing procedure illustrated in FIG. 8B may be preferable when all money input into the gaming device belongs to the primary or pilot player. For example, if one of two friends has already lost all of his or her daily budgeted money, the other friend may direct some of his or her credits to the secondary credit meter so that the friends can still have a shared gaming experience while the friend with the remaining money controls the amount loaned or given to the other friend. This situation may be similar to a craps player allowing another player to place a "gift" $20 bet for having a favorable streak of dice rolling.

Referring to FIG. 8C, the credit sharing procedure utilizing separate credit meters automatically splits credits input into the gaming device (500) between a first credit meter (502) and a second credit meter (504). In the embodiment illustrated in FIG. 8C, the first credit meter is attributed to the player 1 and the second credit meter is attributed to player 2. In other embodiments, however, this attribution can be reversed or changed for additional players playing on additional gaming stations. The gaming device may be configured to split the credits equally between the players or the players may select how the credits should be split. For example, if player 1 contributes $100.00 and player 2 contributes $20.00, the players may set the gaming device to split the credits at a 5:1 ratio for player 1. In other embodiments, the gaming device may simply ask for one player to input credits to increment the first credit meter (502) before asking for the other player to input credits to increment the second credit meter (504). In these embodiments, the gaming device may track the amounts contributed by each player and automatically split awards according to the tracked contribution ratio.

In operation, wagers placed by player 1 are deducted from the first credit meter (510) and any awards won by player 1 during the gaming session will be credited back to the first credit meter (515). In addition, these wins may increment player 1's score meter (512). Similarly, wagers placed by player 2 are deducted from the second credit meter (520) and any wins by player 2 during the gaming session will be credited back to the second credit meter (525). In addition, these wins by player 2 may increment player 2's score meter (522).

If the gaming device is configured to include shared bonuses (i.e., cooperative bonuses or dual-player interactive bonuses) where both player 1 and player 2 are eligible to receive credits and score points, credits won that are attributed to player 1 may be transferred to the first credit meter (598). Credits won in the shared bonus that are attributed to player 2 may be transferred to the second credit meter (597). In shared bonuses where players share a final award, the final award may be automatically split (599) between the first credit meter (502) and the second credit meter (504) according to the split ratio established earlier. The player scores, however, may be incremented according to each of the player's performance/results from the bonus ((585/595). As mentioned above, these shared bonuses can be triggered during a gaming session wagered on by either player 1 (580) or player 2 (590).

This credit sharing procedure may be advantageous where players are playing separate base games with separate credit meters or where players have each input a different amount of money, but still want to participate in shared bonuses.

When cashing out credits using the ticket printer 38 (FIG. 1) or coin hopper (not shown), each of these various embodiments of the gaming device may be handled differently. For embodiments where the players share a common credit meter (FIG. 8A), a single ticket may be printed to reflect the amount shown by the common credit meter. In embodiments where there is a primary credit meter and a secondary credit meter (FIG. 8B), a single ticket could be printed out for the combined total of the primary and secondary credit meters, or individual tickets for each of the credit meters may be printed. In embodiments where there is a first credit meter and a second credit meter, individual tickets for each of the credit meters may preferably be printed.

Figure 9:
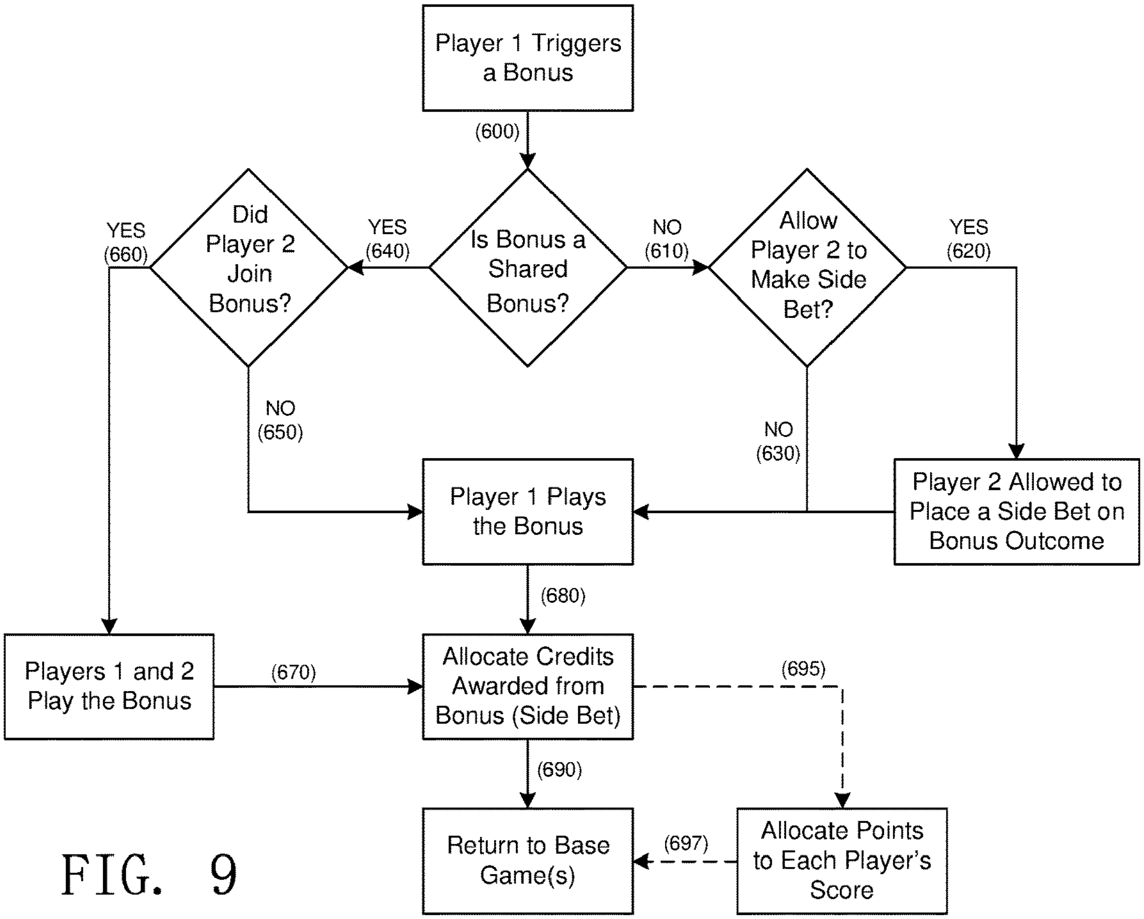
FIG. 9 is a flow diagram of a bonus procedure according to embodiments of the invention.

FIG. 9 is a flow diagram of a bonus procedure according to embodiments of the invention.

Referring to FIG. 9, a bonus game is initiated (600) by a bonus trigger. In the embodiment illustrated in FIG. 9, a bonus game has been initiated (600) because player 1 has triggered a bonus. Player 2, however, may also initiate a bonus game (600) by triggering a bonus, or the gaming device (or gaming server) may randomly trigger a bonus for either player. After the bonus has been triggered, the gaming device determines if the bonus is a shared bonus. If the bonus is a shared bonus (640), the gaming device next determines whether player 2 has joined the bonus. That is, with some embodiments having a shared bonus, the non-triggering player may decide not to participate in the shared bonus (particularly if the non-triggering player is at risk of losing credits). In these situations, the triggering player will play the bonus by himself or herself, or a single-player bonus may be substituted with a similar average payback (650). If, on the other hand, the second player chooses to join the shared bonus (660), the shared bonus is played and any credits awarded during the bonus will be allocated to each of the players (670).

Returning to the gaming devices determination of bonus type, if the gaming device determines that the bonus is not a shared bonus (610), the gaming device next determines if player 2 is allowed to make a side bet on the bonus. In some embodiments, side bets from a non-triggering player may increase the friendly competition among the players. For example, a side bet may be made that player 1 does not reach a certain award threshold. In another example, a side bet may be made such that player 1 will only make two successful picks before picking a bonus stopping symbol. Various other side bets may be presented to the second player based on the performance or luck of the first player. The side bet may deduct a certain number of credits from the second player's credit meter (or from the common credit meter as a form of an insurance bet). If the second player is allowed to place a side bet (620), the gaming device determines the form and amount of the side bet and then allows player 1 to play the bonus (630). If the gaming device determines that a side bet is not available, player 1 begins play of the bonus (630).

After player 1 has completed the bonus (680), any awards from the bonus including side bet awards are determined and allocated to the proper credit meters. After the credit allocation has been completed, the gaming device returns to the one or more base games (690) on the gaming device. If player scores are being kept, points attributable to each player may be incremented on the respective player point meters (695) before returning to the base games (697).

Figure 10A:
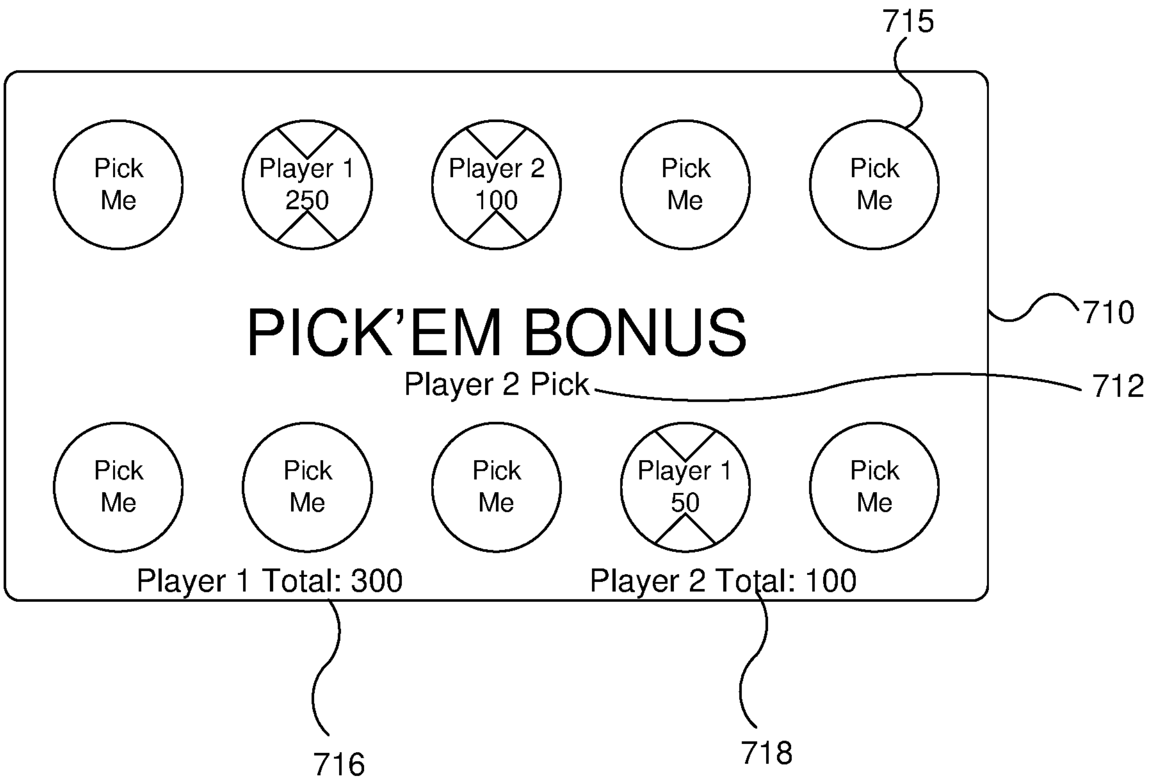
FIGS. 10A, 10B, and 10C are detail diagrams of bonus procedures according to embodiments of the invention.
Figure 10B:
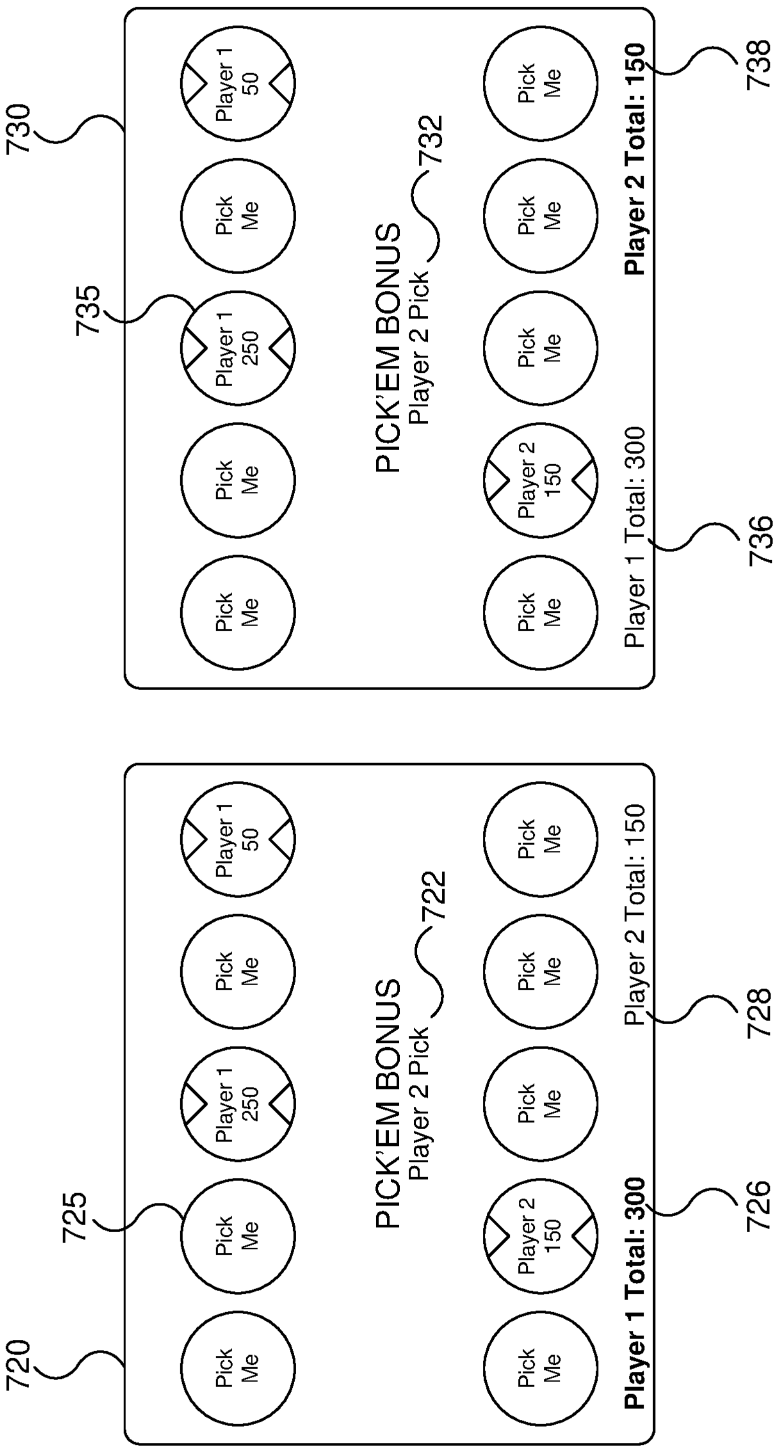
Figure 10C:
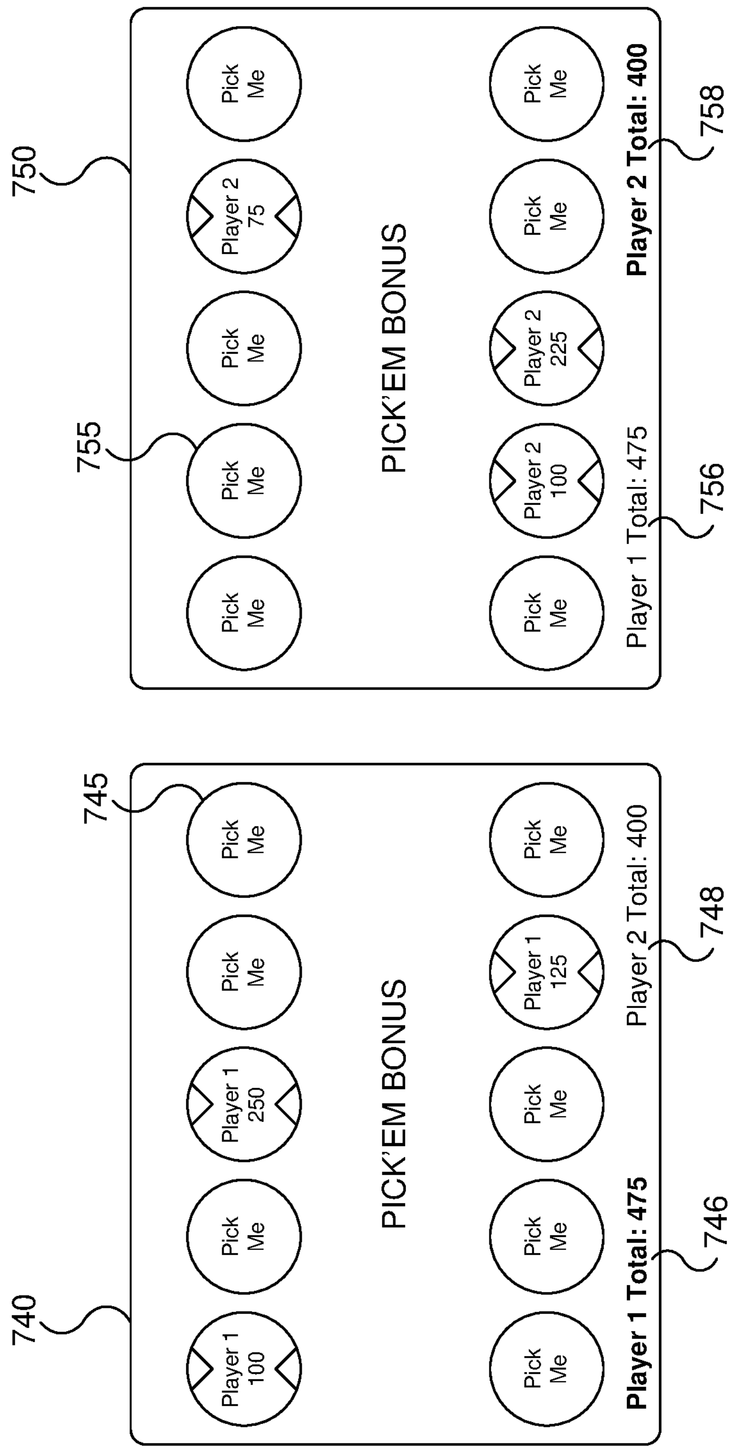

FIGS. 10A, 10B, and 10C are detail diagrams of bonus procedures according to embodiments of the invention. FIG. 10A illustrates a bonus procedure implemented on common display, while FIGS. 10B and 10C illustrate bonus procedures implemented on partitioned or separate displays.

Referring to FIG. 10A, the bonus implemented on the shared display 710 is a shared bonus where the players can compete for a better bonus score. In this embodiment, player 1 and player 2 are presented a screen of ten selectable objects 715 and take turns choosing available selectable objects 715. A player turn indicator 712 may be used to keep track of which player has the next pick. FIG. 10B, and FIG. 10C, embodiments of a secondary bonus procedure are described. The common display 710 may also include player score meters 716, 718 that respectively keep the total score for player 1 716 and the total score for player 2 718.

Each player may be allowed to choose a predetermined number (e.g., three) of the selectable objects 715 or the bonus may continue until a "stop bonus" symbol is chosen or all of the objects 715 have been chosen. The player who triggered the bonus may be awarded the first selection. Once the first player makes a selection, a value is revealed for that selection on both bonus screens and the object 715 becomes unselectable for both players. The second player may then select one of the remaining nine objects. Alternate selections are made until both players have exhausted their three selections. Each value corresponding to a player's selection may be added to that player's score meter 716, 718. At the end of the bonus the player with the larger value on their player score meter 716, 718 may be indicated as winning the bonus competition. In some embodiments, each of the player score meter values may be added to the player's respective credit meter or to the common credit meter. However, in other embodiments, only the winning player's win meter is added to that player's credit meter or the common credit meter.

Referring to FIG. 10B, the illustrated bonus is a shared bonus that is implemented on a partitioned display or separate displays 720, 730 where the players can compete for a better bonus score. This embodiment may be similar to the embodiment described above with reference to FIG. 10A, except that it is implemented on different portions of a display or separate displays 720, 730. Like the embodiment described above, each player is presented with 10 selectable objects 725, 735. Here, each object 725 on the first display 720 corresponds to similarly located object 735 on the second display 730. Thus, if player 1 selects the upper middle object on the first display 720, which is revealed to be worth 250 credits, the revealed object and credit amount is also shown on the second display 730. Each display 720, 730 may also include player score meters 726, 728, 736, 738 that show each player's score. The first display 720 may highlight the first player's score 726 since player 1 is playing on the first display 720. Similarly, the second display 730 may highlight the second player's score 738 since player 2 is playing on the second display 730. Additionally, each of the first display 720 and the second display 730 may have a respective player turn indicator 722, 732 to show which player has the next selection.

Referring to FIG. 10C, the illustrated bonus is a shared bonus that is implemented on a partitioned display or separate displays 740, 750. As with the embodiment described with reference to FIG. 10B, each display 740, 750 shows ten selectable objects 745, 755. In this embodiment, however, the selectable objects 745, 755 do not directly correspond to one another. That is, a similarly positioned selectable object does not necessarily have a similarly located corresponding object on the other display. Rather, in this embodiment, each player makes selections independent of the other player. Thus, as shown in FIG. 10C player 1 has made three selections on the first display 740 with a total of 475 credits that is reflected on the player score meter 746 on the first display 740 and is reflected on the player score meter 756 on the second display 750. Player 2, on the other hand, has made three selections on the second display 750 with a total of 400 credits that is reflected on the player score meter 748 on the first display 740 and reflected on the player score meter 758 on the second display 750.

In this embodiment, each player may be given a predetermined number of selections (e.g., three selections) or each player may continue choosing selectable objects 745, 755 until a "stop bonus" symbol is selected. In some embodiments, the same distribution of bonus values is given to both players, although not arranged behind the same selectable objects 745, 755, so that the only variable in the player's scores is based on the particular selections made by each player. In other embodiments, a script may be used to determine the order of the selections made by each player.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. At least one non-transitory computer readable medium that stores a plurality of instructions, the plurality of instructions, when executed by at least one processor, causes the at least one processor to:

receive a first game credit via an electronic gaming device from a first player at a first gaming station of an electronic gaming device;

receive a second game credit via the gaming device from a second player at a second gaming station of the electronic gaming device;

receive an input from at least one of the players at the electronic gaming device to allocate at least a portion of their game credits to a player-selectable wager amount for each outcome in each of the group consisting of an outcome of a first game, an outcome of a second game, and the better of the first and second game outcomes;

receive a first signal responsive to an input made by the first player at the electronic gaming device indicating that the player has initiated the first game, the first game being displayed at least at the first gaming station and generating the first game outcome;

receive a second signal responsive to an input made by the second player at the electronic gaming device indicating that the player has initiated the second game separate from the first game;

substantially synchronize display of the outcomes of the first and second games;

display the outcome of the second game adjacent display of the outcome of the first game; and award prizes to each player based on the outcomes.

2. The at least one non-transitory computer readable medium of claim 1 wherein the plurality of instructions, when executed by the at least one processor, further causes the at least one processor to:

display the outcome of a first spinning reel slot game at both gaming stations; and display the outcome of a second spinning reel slot game at both gaming stations.

3. The at least one non-transitory computer readable medium of claim 2 wherein the first and second spinning reel slot games respectively include a first mechanical spinning reel display and a second mechanical spinning reel display.

4. The at least one non-transitory computer readable medium of claim 3 wherein the first and second mechanical spinning reel displays each include at least one of a three-reel display, a four-reel display, or a five-reel display.

5. The at least one non-transitory computer readable medium of claim 2 wherein the first and second spinning reel slot games respectively include a first video spinning reel display and a second video spinning reel display.

6. The at least one non-transitory computer readable medium of claim 5 wherein the video spinning reel displays include at least one of a three-reel display, a four-reel display, or a five-reel display.

7. The at least one non-transitory computer readable medium of claim 1 wherein the electronic gaming devices are each a video poker game and wherein events in the games comprise video poker hands.

8. A gaming system comprising:
- a first electronic gaming machine including:
  - a first non-transitory memory device configured to store computer-readable instructions to facilitate play of the electronic gaming machine,
  - a first accepting device configured to engage a physical item associated with a monetary value, the monetary value establishing a game-credit balance that is decreasable based on at least wagering activity, and
  - a first display screen for displaying outcomes of games played on the first electronic gaming machine;
- a second electronic gaming machine including:
  - a second non-transitory memory device configured to store computer-readable instructions to facilitate play of the electronic gaming machine,
  - a second accepting device configured to engage a physical item associated with a monetary value, the monetary value establishing a game-credit balance that is decreasable based on at least wagering activity, and
  - a second display screen for displaying outcomes of games played on the second electronic gaming machine;
- a network operatively connecting the first and second gaming machines;
- at least one computing processor connected to the network, the at least one processor configured to:
  - track a first game credit wagered by a first player at the first electronic gaming machine;
  - track a second game credit wagered by a second player at the second electronic gaming machine;
  - receive an input from at least one of the players at their electronic gaming machine to allocate at least a portion of their game credits to a player-selectable wager amount for each outcome in each of the group consisting of an outcome of a first game, an outcome of a second game, and the better of the first and second game outcomes;
  - receive a first signal responsive to an input made by the first player at the first electronic gaming machine indicating that the player has initiated a first game on the first electronic gaming machine;
  - receive a second signal responsive to an input made by the second player at the second electronic gaming machine indicating that the player has initiated a second game separate from the first game on the second electronic gaming machine;
  - substantially synchronize display of the outcomes of the first and second games;
  - display the outcome of the second game adjacent display of the outcome of the first game; and
  - award prizes to each player based on the outcomes.

9. The gaming system of claim 8 wherein the games played on the first and second electronic gaming machine comprise spinning reel slot games.

10. The gaming system of claim 9 wherein the spinning reel slot games include mechanical spinning reels.

11. The gaming system of claim 10 wherein the mechanical spinning reels include at least one of a three-reel display, a four-reel display, or a five-reel display.

12. The gaming system of claim 9 wherein the spinning reel slot games include video spinning reel displays.

13. The gaming system of claim 12 wherein the video spinning reel displays include at least one of a three-reel display, a four-reel display, or a five-reel display.

14. The gaming system of claim 8 wherein the electronic gaming machines are each a video poker game and wherein events in the games comprise video poker hands.

15. The method of claim 12 wherein initiating video spinning reel displays comprises initiating at least one of a three-reel display, a four-reel display, or a five-reel display.

16. A method of sharing game play comprising:
- receiving a first game credit via a first electronic gaming machine from a first player at a first electronic gaming machine;
- receiving a second game credit via a second electronic gaming machine from a second player at a second electronic gaming machine;
- receiving an input from at least one of the players at their gaming machine to allocate at least a portion of their game credits to a player-selectable wager amount for each outcome in each of the group consisting of an outcome of a first game, an outcome of a second game, and the better of the first and second game outcomes;
- initiating a first game on the first electronic gaming machine responsive to an input received from the first player at the first electronic gaming machine, the first game being displayed at least at the first electronic gaming machine and generating the first game outcome;
- initiating a second game on the second electronic gaming machine responsive to an input received from the second player at the second electronic gaming machine, the second game being displayed at least at the second electronic gaming machine and generating the second game outcome;
- substantially synchronizing display of the outcomes of the first and second games;
- displaying the outcome of the first game on a first display at the first electronic gaming machine;
- displaying the outcome of the second game adjacent display of the first outcome; and
- awarding prizes to each player based on the outcomes.

17. The method of claim 16 wherein initiating the first and second games comprises initiating spinning reel slot games.

18. The method of claim 17 wherein initiating spinning reel slot games spinning at least one of a three-reel display, a four-reel display, or a five-reel display.

19. The method of claim 17 wherein initiating the first and second games comprises initiating video spinning reel displays.

20. The method of claim 16 wherein the electronic gaming machines are each a video poker game and wherein initiating the first and second games comprises dealing video poker cards.

* * * * *